(12) United States Patent
Hu

(10) Patent No.: US 10,498,637 B2
(45) Date of Patent: Dec. 3, 2019

(54) SWITCH PROCESSING METHOD, CONTROLLER, SWITCH, AND SWITCH PROCESSING SYSTEM

(71) Applicant: HUAWEI TECHNOLOGIES CO., LTD., Shenzhen, Guangdong (CN)

(72) Inventor: Weiqi Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 140 days.

(21) Appl. No.: 15/499,163

(22) Filed: Apr. 27, 2017

(65) Prior Publication Data
US 2017/0289026 A1 Oct. 5, 2017

Related U.S. Application Data

(63) Continuation of application No. PCT/CN2014/089701, filed on Oct. 28, 2014.

(51) Int. Cl.
*H04L 12/721* (2013.01)
*H04L 12/931* (2013.01)

(52) U.S. Cl.
CPC ............. *H04L 45/38* (2013.01); *H04L 49/70* (2013.01)

(58) Field of Classification Search
CPC ......... H04L 45/14; G06F 15/173; H04W 4/00
USPC ................... 370/255–339; 709/223
See application file for complete search history.

(56) References Cited

U.S. PATENT DOCUMENTS

| | | | |
|---|---|---|---|
| 8,391,282 B1 | 3/2013 | Lu et al. | |
| 2007/0230487 A1 | 10/2007 | Tanaka | |
| 2010/0257263 A1* | 10/2010 | Casado | H04L 49/00 709/223 |
| 2013/0003549 A1 | 1/2013 | Matthews et al. | |

(Continued)

FOREIGN PATENT DOCUMENTS

| | | |
|---|---|---|
| CN | 102546351 | 7/2012 |
| CN | 102726007 | 10/2012 |

(Continued)

OTHER PUBLICATIONS

International Search Report, dated Jul. 1, 2015, in International Application No. PCT/CN2014/089701 (4 pp.).

(Continued)

*Primary Examiner* — Iqbal Zaidi
(74) *Attorney, Agent, or Firm* — Slater Matsil, LLP

(57) ABSTRACT

Embodiments of the present invention provide a switch processing method, a controller, a switch, and a switch processing system. The method provided by the embodiments of the present invention is executed by the controller and a logical Switch, where the logical Switch includes at least two physical Switches. The method includes: allocating, by the controller, a flow table of the logical Switch to each physical Switch; sending, by the controller, mapping information, so that each physical Switch obtains the mapping information; and sending, by the controller, flow entries, so that each physical Switch obtains flow entries corresponding to each physical switch and processes a data packet. For the logical Switch for executing the method provided by the embodiments of the present invention, new physical Switches may be stacked on a basis of a physical structure of the logical Switch.

18 Claims, 14 Drawing Sheets

(56) References Cited

U.S. PATENT DOCUMENTS

| | | | |
|---|---|---|---|
| 2013/0044641 A1* | 2/2013 | Koponen | H04L 12/66 370/255 |
| 2013/0170503 A1 | 7/2013 | Ooishi | |
| 2014/0169158 A1 | 6/2014 | Mishra et al. | |
| 2015/0180801 A1 | 6/2015 | Casado et al. | |

FOREIGN PATENT DOCUMENTS

| | | |
|---|---|---|
| CN | 103200101 | 7/2013 |
| CN | 103347013 | 10/2013 |
| JP | 2012525017 A | 10/2012 |
| KR | 1020120016080 A | 2/2012 |
| RU | 2 388 160 C2 | 10/2008 |
| WO | WO2010115060 | 10/2010 |
| WO | 2012049925 A1 | 4/2012 |
| WO | 2013/158918 A1 | 10/2013 |
| WO | 2014/147197 A1 | 9/2014 |
| WO | 2015021881 A1 | 2/2015 |

OTHER PUBLICATIONS

Notice of Allowance, dated Nov. 5, 2018, in Japanese Application No. 2017522972 (3 pp.).
Office Action, dated Apr. 27, 2018, in Chinese Application No. 201480024931.3 (8 pp.).
International Search Report dated Jul. 1, 2015 in corresponding International Application No. PCT/CN2014/089701.
Notice to Submit a Response, dated Sep. 17, 2018, in Korean Application No. 1020177012348 (7 pp.).
Andreas Wundsam et al., *NOSIX: A Portable Switch Interface for the Network Operating System*, International Computer Science Institute, TR-12-013, Oct. 2012, XP55120614A (7 pp.).
Extended European Search Report, dated Oct. 17, 2017, in European Application No. 14905150.0 (9 pp.).
Russian Office Action dated Apr. 5, 2018, in related Russian Patent Application No. 2017115884/08, 9 pgs.
Russian Search Report dated Mar. 30, 2018, in related Russian Patent Application No. 2017115884/08, 4 pgs.

* cited by examiner

SWITCH PROCESSING METHOD, CONTROLLER, SWITCH, AND SWITCH PROCESSING SYSTEM

CROSS-REFERENCE TO RELATED APPLICATIONS

This application is a continuation of International Application No. PCT/CN2014/089701, filed on Oct. 28, 2014, the disclosure of which is hereby incorporated by reference in its entirety.

TECHNICAL FIELD

Embodiments of the present invention relate to the communications technologies, and in particular, to a switch processing method, a controller, a switch, and a switch processing system.

BACKGROUND

Software-defined networking (SDN) is a network architecture for decoupling control from forwarding, and has features of centralized control and an open programmable interface, that is, a controller on a control plane can control a switch on a forwarding plane by using a network communications protocol, for example, by using a new network switch model that is put forward, namely, the OpenFlow protocol.

In the prior art, the controller may control an action of the switch on the forwarding plane by using the Openflow protocol. The Switch bears multiple flow tables of service logic, that is, the Switch uses a pipeline based on flow tables to process a data packet. Specifically, each flow table may include multiple flow entries, where the flow entries are used to bear basic processing logic of the Openflow protocol. When receiving a data packet, the Switch matches the flow entries one by one according to a preconfigured priority order by using match fields in the flow entries, and after a flow entry is matched successfully, executes executable instructions in the flow entry, where the instructions include, for example, an operation (Action) list, modifying metadata, and directing to a subsequent flow table. Because a data packet generally needs to undergo matching processing of multiple flow tables, after an input data packet successfully matches a flow entry in a flow table, executable instructions in the flow entry are executed, and then the Switch directs the data packet to a next flow table to continue processing.

However, a quantity of flow tables supported by the pipeline of the Switch and a scale of flow entries that can be processed by the Switch are limited in the prior art. Therefore, when an operator needs to perform capacity expansion in terms of functions or performance for a Switch disposed in a network node, due to a limitation of a hardware capability of the Switch, the operator can only replace a Switch in an existing network with a Switch having a larger capacity or supporting more flow tables. Therefore, costs of network capacity expansion are increased.

SUMMARY

Embodiments of the present invention provide a switch processing method, a controller, a switch, and a switch processing system, to solve a prior-art problem that when an operator needs to perform capacity expansion in terms of functions or performance for a Switch disposed in a network node, the operator can only replace a Switch in an existing network due to a limitation of a hardware capability of the Switch, so as to reduce costs of network capacity expansion.

According to a first aspect, an embodiment of the present invention provides a switch processing method, where the method is executed by a controller and a logical switch, the logical Switch includes at least two physical Switches, and the method includes:

allocating, by the controller, each flow table in multiple flow tables of the logical Switch to each physical Switch, where the multiple flow tables are a pipeline of the logical Switch;

sending, by the controller, mapping information, so that each physical Switch obtains the mapping information, where the mapping information includes a mapping relationship between the physical Switch and each flow table in the multiple flow tables; and sending, by the controller, flow entries to the logical Switch, so that each physical Switch obtains flow entries corresponding to each physical switch and processes a received data packet according to the flow entries or according to the flow entries and the mapping information, where the flow entries are content information of each flow table in a flow table set allocated by the controller to each physical Switch.

In a first possible implementation manner of the first aspect, the at least two physical Switches include a primary Switch and a first extended Switch, where the controller is connected to at least the primary Switch, and the first extended Switch is connected to at least the primary Switch;

the sending, by the controller, mapping information, includes:

sending, by the controller, the mapping information to at least the primary Switch, so that the primary Switch receives the mapping information and that the mapping information received by the first extended Switch includes the mapping information sent by the controller and/or the primary Switch; and the sending, by the controller, flow entries to the logical Switch, includes:

sending, by the controller, the flow entries of the logical Switch to at least the primary Switch, so that the flow entries received by the primary Switch include flow entries corresponding to the primary Switch or flow entries corresponding to each physical Switch and that flow entries received by the first extended Switch include flow entries sent by the controller and/or the primary Switch.

According to the first possible implementation manner of the first aspect, in a second possible implementation manner, the physical Switches further include a second extended Switch, and the second extended Switch is connected to at least the first extended Switch;

the sending, by the controller, mapping information, includes:

sending, by the controller, the mapping information to at least the primary Switch, so that the primary Switch receives the mapping information, the mapping information received by the first extended Switch includes the mapping information sent by the controller and/or the primary Switch, and the mapping information received by the second extended Switch includes the mapping information sent by the controller and/or the primary Switch and/or the first extended Switch; and the sending, by the controller, flow entries to the logical Switch, includes:

sending, by the controller, the flow entries of the logical Switch to at least the primary Switch, so that the flow entries received by the primary Switch include flow entries corresponding to the primary Switch or flow entries corresponding to the primary Switch and flow entries corresponding to the first extended Switch and/or the second extended Switch, flow entries received by the first extended Switch include flow entries corresponding to the first extended Switch and sent by the controller and/or the primary Switch, and flow entries received by the second extended Switch include flow entries corresponding to the second extended Switch and sent by the controller and/or the primary Switch and/or the first extended Switch.

According to the first or the second possible implementation manner of the first aspect, in a third possible implementation manner, a flow table allocated by the controller to the primary Switch includes at least a first flow table table0 in the multiple flow tables of the logical Switch, so that when the primary Switch receives the data packet, the primary Switch processes the data packet by using the table0.

According to any one of the first aspect, or the first or the second possible implementation manner of the first aspect, in a fourth possible implementation manner, the sending, by the controller, flow entries to the logical Switch, includes:

sending, by the controller, the flow entries to the logical Switch, so that when a current physical Switch receives the data packet, the current physical Switch processes the data packet by using a current flow table, determines a location of a next flow table according to the mapping information, and when the determined next flow table is located in the current physical Switch, directs the data packet to the next flow table to continue processing, or when the determined next flow table is located in another physical Switch, initiates pipeline environment protection to generate an encapsulation packet, and sends the encapsulation packet to the physical Switch corresponding to the next flow table.

According to any one of the first aspect, or the first or the second possible implementation manner of the first aspect, in a fifth possible implementation manner, the sending, by the controller, flow entries to the logical Switch, includes:

when a to-be-sent flow entry includes a flow table jump instruction, determining, by the controller, whether a next flow table is located in the current physical Switch; and when determining that the next flow table is located in the current physical Switch, sending, by the controller, the flow entry including the flow table jump instruction to the current physical Switch, so that the current physical Switch directs the data packet to the next flow table to continue processing; or when determining that the next flow table is located in another physical Switch, replacing, by the controller, the flow table jump instruction in the to-be-sent flow entry with a Switch forwarding instruction, and sending the flow entry including the Switch forwarding instruction to the current physical Switch, so that the current physical Switch initiates pipeline environment protection to generate an encapsulation packet and sends the encapsulation packet to the physical Switch corresponding to the next flow table.

According to the fourth or the fifth possible implementation manner of the first aspect, in a sixth possible implementation manner, the pipeline environment protection is that the current physical Switch encapsulates the data packet and related information for processing the data packet into the encapsulation packet, where the related information for processing the data packet includes at least a number ID of the next flow table, and further includes any quantity of the following information: an ingress port (Ingress port), an action set (Action set) currently corresponding to the data packet, and metadata (Metadata).

According to any one of the fourth to the sixth possible implementation manners of the first aspect, in a seventh possible implementation manner, the pipeline environment protection is used to enable the physical Switch corresponding to the next flow table to parse the encapsulation packet received by the physical Switch and obtain parsed information, so as to perform pipeline environment recovery according to the parsed information and direct the data packet to the next flow table to continue processing, where the parsed information includes the data packet and the related information for processing the data packet.

According to any one of the fourth to the sixth possible implementation manners of the first aspect, in an eighth possible implementation manner, the flow entries corresponding to the extended Switch and sent by the controller include a flow entry used for performing pipeline recovery; and the method further includes:

sending, by the controller, the flow entry used for performing pipeline recovery to the extended Switch, so that the extended Switch adds the flow entry to a first flow table table0' of the extended Switch and when the encapsulation packet is received, performs pipeline environment recovery by using the flow entry added to the table0'.

According to the eighth possible implementation manner of the first aspect, in a ninth possible implementation manner, the encapsulation packet includes the ID of the next flow table, and the flow entry used for performing pipeline recovery includes a match part and an executable instruction, where the match part is used by the extended Switch to take the ID of the next flow table as a match object corresponding to the flow entry, and the executable instruction includes a flow table recovery instruction and/or a flow table jump instruction; and the pipeline environment recovery is that the extended Switch matches, by using the flow entry in the table0', the encapsulation packet received by the extended Switch, and when the ID of the next flow table matches the flow entry in the table0', executes the flow table recovery instruction and/or the flow table jump instruction in the matched flow entry in sequence according to a match result.

According to a second aspect, an embodiment of the present invention provides a switch processing method, where the method is executed by a controller and a logical Switch, the logical Switch includes at least two physical Switches, and the at least two physical Switches include a primary Switch and an extended Switch, where the controller is connected to at least the primary Switch, and the method includes:

receiving, by the primary Switch, mapping information sent by the controller, where the mapping information includes a mapping relationship between the physical Switch and each flow table in multiple flow tables of the logical Switch;

receiving, by the primary Switch, flow entries sent by the controller, where the flow entries received by the primary Switch are content information of each flow table in a flow table set allocated by the controller to the primary Switch or allocated by the controller to the primary Switch and the extended Switch; and processing, by the primary Switch, a received data packet according to the flow entries or according to the flow entries and the mapping information.

In a first possible implementation manner of the second aspect, after the receiving, by the primary Switch, a mapping relationship sent by the controller, the method further includes:

sending, by the primary Switch, the mapping information to the extended Switch connected to the primary Switch; and after the receiving, by the primary Switch, flow entries sent by the controller, the method further includes:

sending, by the primary Switch, to the extended Switch connected to the primary Switch, flow entries allocated by the controller.

According to the second aspect or the first possible implementation manner of the second aspect, in a second possible implementation manner, the extended Switch includes a first extended Switch and a second extended Switch, the primary Switch is connected to at least the first extended Switch, and the second extended Switch is connected to at least the first extended Switch;

after the receiving, by the primary Switch, mapping information sent by the controller, the method further includes:

sending, by the primary Switch, the mapping information to the first extended Switch and/or the second extended Switch; and after the receiving, by the primary Switch, flow entries sent by the controller, the method further includes:

sending, by the primary Switch, to the first extended Switch and/or the second extended Switch, flow entries allocated by the controller, so that the extended Switch processes the received data packet according to the mapping information and the flow entries corresponding to the extended Switch.

According to any one of the second aspect, or the first or the second possible implementation manner of the second aspect, in a third possible implementation manner, the mapping information received by the primary Switch includes a flow table allocated by the controller to the primary Switch, where the flow table includes at least a first flow table table0 in the multiple flow tables of the logical Switch; and the processing, by the primary Switch, a received data packet according to the flow entries or according to the flow entries and the mapping information, includes:

processing, by the primary Switch, the received data packet according to the flow entries or according to the flow entries and the mapping information by using the table0.

According to any one of the second aspect, or the first to the third possible implementation manners of the second aspect, in a fourth possible implementation manner, the processing, by the primary Switch, a received data packet according to the flow entries or according to the flow entries and the mapping information, includes:

when receiving the data packet, processing, by the primary Switch, the data packet, and determining a location of a next flow table according to the mapping information; and when the next flow table is located in the primary Switch, directing, by the primary Switch, the data packet to the next flow table to continue processing; or when the next flow table is located in the extended Switch, initiating, by the primary Switch, pipeline environment protection to generate an encapsulation packet, and sending the encapsulation packet to the extended Switch corresponding to the next flow table.

According to any one of the second aspect, or the first to the third possible implementation manners of the second aspect, in a fifth possible implementation manner, the receiving, by the primary Switch, flow entries sent by the controller, includes:

receiving, by the primary Switch, a flow entry that includes a flow table jump instruction or a Switch forwarding instruction and is sent by the controller, where the flow table jump instruction or the Switch forwarding instruction in the flow entry is determined by the controller according to whether a next flow table in the flow entry is located in the primary Switch, and if yes, the flow entry includes the flow table jump instruction, or if no, the flow entry includes the Switch forwarding instruction; and the processing, by the primary Switch, a received data packet according to the flow entries or according to the flow entries and the mapping information, includes:

receiving, by the primary Switch, the data packet, and when the flow entry matching the data packet includes the flow table jump instruction, directing the data packet to the next flow table to continue processing; or receiving, by the primary Switch, the data packet, and when the flow entry matching the data packet includes the Switch forwarding instruction, initiating pipeline environment protection to generate an encapsulation packet, and sending the encapsulation packet to an extended Switch corresponding to the next flow table.

According to the fourth or the fifth possible implementation manner of the second aspect, in a sixth possible implementation manner, the initiating, by the primary Switch, pipeline environment protection includes:

encapsulating, by the primary Switch, the data packet and related information for processing the data packet into the encapsulation packet, where the related information for processing the data packet includes at least a number ID of the next flow table, and further includes any quantity of the following information: an ingress port (Ingress port), an action set (Action set) currently corresponding to the data packet, and metadata (Metadata).

According to any one of the fourth to the sixth possible implementation manners of the second aspect, in a seventh possible implementation manner, the pipeline environment protection is used to enable the extended Switch corresponding to the next flow table to parse the encapsulation packet received by the extended Switch and obtain parsed information, so as to perform pipeline environment recovery according to the parsed information and direct the data packet to the next flow table to continue processing, where the parsed information includes the data packet and the related information for processing the data packet.

According to a third aspect, an embodiment of the present invention provides a switch processing method, where the method is executed by a controller and a logical Switch, the logical Switch includes multiple physical Switches, the multiple physical Switches include a primary Switch and an extended Switch, and the extended Switch includes a first extended Switch and a second extended Switch, where the controller is connected to at least the primary Switch, the primary Switch is connected to at least the first extended Switch, the second extended Switch is connected to at least the first extended Switch, and the method includes:

receiving, by the current extended Switch, mapping information sent by the controller and/or the primary Switch and/or another extended Switch, where the mapping information includes a mapping relationship between the physical Switch and each flow table in multiple flow tables of the logical Switch;

receiving, by the current extended Switch, flow entries corresponding to the current extended Switch and sent by the controller and/or the primary Switch and/or the another extended Switch, where the flow entries received by the current extended Switch are content information of each flow table in a flow table set allocated by the controller to the current extended Switch; and processing, by the current extended Switch, a received first encapsulation packet according to the flow entries or according to the flow entries and the mapping information, where the first encapsulation packet is generated by a physical Switch in which a previous flow table is located, by encapsulating a data packet received by the physical Switch and related information for processing the data packet.

In a first possible implementation manner of the third aspect, in the mapping information received by the current extended Switch, a first flow table table0 in the multiple flow tables of the logical Switch corresponds to the primary Switch.

According to the third aspect or the first possible implementation manner of the third aspect, in a second possible implementation manner, after the receiving, by the current extended Switch, flow entries corresponding to the current extended Switch and sent by the controller and/or the primary Switch and/or the another extended Switch, the method further includes:

receiving, by the current extended Switch, the first encapsulation packet;

determining, by the current extended Switch, that a number ID of a next flow table in the first encapsulation packet is located in another physical Switch; and forwarding, by the current extended Switch according to the mapping information, the first encapsulation packet to the physical Switch corresponding to the ID of the next flow table.

According to the third aspect or the first possible implementation manner of the third aspect, in a third possible implementation manner, after the receiving, by the current extended Switch, flow entries corresponding to the current extended Switch and sent by the controller and/or the primary Switch and/or the another extended Switch, the method further includes:

receiving, by the current extended Switch, the first encapsulation packet;

determining, by the current extended Switch, that a number ID of a next flow table in the first encapsulation packet is located in the current extended Switch; and performing, by the current extended Switch, pipeline environment recovery on the first encapsulation packet to obtain the data packet.

According to the third possible implementation manner of the third aspect, in a fourth possible implementation manner, the performing, by the current extended Switch, pipeline environment recovery on the first encapsulation packet, includes:

parsing, by the current extended Switch, the received first encapsulation packet to obtain parsed information, where the parsed information includes the data packet and the related information for processing the data packet, where the related information for processing the data packet includes at least the ID of the next flow table, and further includes any quantity of the following information: an ingress port (Ingress port), an action set (Action set) currently corresponding to the data packet, and metadata (Metadata); and performing, by the current extended Switch, pipeline environment recovery according to the parsed information, and directing the data packet to the next flow table to continue processing.

According to the third possible implementation manner of the third aspect, in a fifth possible implementation manner, the flow entries received by the current extended Switch include a flow entry used for performing pipeline recovery and sent by the controller; and the performing, by the current extended Switch, pipeline environment recovery on the first encapsulation packet, includes:

adding, by the current extended Switch, the flow entry used for performing pipeline recovery to a first flow table table0' of the current extended Switch; and performing, by the current extended Switch, pipeline environment recovery on the first encapsulation packet by using the flow entry added to the table0'.

According to the fifth possible implementation manner of the third aspect, in a sixth possible implementation manner, the first encapsulation packet includes the ID of the next flow table, and the flow entry used for performing pipeline recovery includes a match part and an executable instruction, where the executable instruction includes a flow table recovery instruction and/or a flow table jump instruction; and the performing, by the current extended Switch, pipeline environment recovery on the first encapsulation packet by using the flow entry added to the table0', includes:

matching, by the current extended Switch, the first encapsulation packet by using the flow entry in the table0'; and when the flow entry in the table0' is matched successfully, executing, by the current extended Switch, the flow table recovery instruction and/or the flow table jump instruction in the matched flow entry in sequence according to a match result.

According to any one of the third to the sixth possible implementation manners of the third aspect, in a fourth possible implementation manner, after the performing, by the current extended Switch, pipeline environment recovery on the first encapsulation packet to obtain the data packet, the method further includes:

when obtaining the data packet, processing, by the current extended Switch, the data packet by using the current flow table, and determining a location of a next flow table according to the mapping information; and when the next flow table is located in the current extended Switch, directing, by the current extended Switch, the data packet to the next flow table to continue processing; or when the next flow table is located in the another extended Switch, initiating, by the current extended Switch, pipeline environment protection to generate a second encapsulation packet, and sending the second encapsulation packet to the extended Switch corresponding to the next flow table.

According to any one of the third to the sixth possible implementation manners of the third aspect, in an eighth possible implementation manner, the method further includes:

receiving, by the current extended Switch, a flow entry that includes a flow table jump instruction or a Switch forwarding instruction and is sent by the controller, where the flow table jump instruction or the Switch forwarding instruction in the flow entry is determined by the controller according to whether the next flow table in the flow entry is located in the current extended Switch, and if yes, the flow entry includes the flow table jump instruction, or if no, the flow entry includes the Switch forwarding instruction; and after the performing, by the current extended Switch, pipeline environment recovery on the first encapsulation packet, the method further includes:

obtaining, by the current extended Switch, the data packet in the first encapsulation packet, and when the flow entry matching the data packet includes the flow table jump instruction, directing the data packet to the next flow table to continue processing; or obtaining, by the current extended Switch, the data packet in the first encapsulation packet, and when the flow entry matching the data packet includes the Switch forwarding instruction, initiating pipeline environment protection to generate a second encapsulation packet, and sending the second encapsulation packet to an extended Switch corresponding to the next flow table.

According to the seventh or the eighth possible implementation manner of the third aspect, in a ninth possible implementation manner, the initiating, by the current extended Switch, pipeline environment protection, includes:

encapsulating, by the current extended Switch, the data packet and related information for processing the data packet into the second encapsulation packet, where the related information for processing the data packet includes at least an ID of the next flow table, and further includes any quantity of the following information: an ingress port (Ingress port), an action set (Action set) currently corresponding to the data packet, and metadata (Metadata).

According to a fourth aspect, an embodiment of the present invention provides a switch processing apparatus, where the apparatus is disposed in a controller connected to a logical switch, the logical Switch includes at least two physical Switches, and the apparatus includes:

an allocation module, configured to allocate each flow table in multiple flow tables of the logical Switch to each physical Switch, where the multiple flow tables are a pipeline of the logical Switch; and a sending module, configured to send mapping information, so that each physical Switch obtains the mapping information, where the mapping information includes a mapping relationship between the physical Switch and each flow table in the multiple flow tables; where the sending module is further configured to send flow entries to the logical Switch, so that each physical Switch obtains flow entries corresponding to each physical switch and processes a received data packet according to the flow entries or according to the flow entries and the mapping information, where the flow entries are content information of each flow table in a flow table set allocated by the controller to each physical Switch.

In a first possible implementation manner of the fourth aspect, the at least two physical Switches include a primary Switch and a first extended Switch, where the controller is connected to at least the primary Switch, and the first extended Switch is connected to at least the primary Switch;

that the sending module is configured to send mapping information includes: sending the mapping information to at least the primary Switch, so that the primary Switch receives the mapping information and that the mapping information received by the first extended Switch includes the mapping information sent by the controller and/or the primary Switch; and that the sending module is further configured to send flow entries to the logical Switch includes: sending the flow entries of the logical Switch to at least the primary Switch, so that the flow entries received by the primary Switch include flow entries corresponding to the primary Switch or flow entries corresponding to each physical Switch and that flow entries received by the first extended Switch include flow entries sent by the controller and/or the primary Switch.

According to the first possible implementation manner of the fourth aspect, in a second possible implementation manner, the physical Switches further include a second extended Switch, and the second extended Switch is connected to at least the first extended Switch;

that the sending module is configured to send mapping information includes: sending the mapping information to at least the primary Switch, so that the primary Switch receives the mapping information, the mapping information received by the first extended Switch includes the mapping information sent by the controller and/or the primary Switch, and the mapping information received by the second extended Switch includes the mapping information sent by the controller and/or the primary Switch and/or the first extended Switch; and that the sending module is further configured to send flow entries to the logical Switch includes: sending the flow entries of the logical Switch to at least the primary Switch, so that the flow entries received by the primary Switch include flow entries corresponding to the primary Switch or flow entries corresponding to the primary Switch and flow entries corresponding to the first extended Switch and/or the second extended Switch, flow entries received by the first extended Switch include flow entries corresponding to the first extended Switch and sent by the controller and/or the primary Switch, and flow entries received by the second extended Switch include flow entries corresponding to the second extended Switch and sent by the controller and/or the primary Switch and/or the first extended Switch.

According to the first or the second possible implementation manner of the fourth aspect, in a third possible implementation manner, a flow table allocated by the allocation module to the primary Switch includes at least a first flow table table0 in the multiple flow tables of the logical Switch, so that when the primary Switch receives the data packet, the primary Switch processes the data packet by using the table0.

According to any one of the fourth aspect, or the first or the second possible implementation manner of the fourth aspect, in a fourth possible implementation manner, that the sending module is further configured to send flow entries to the logical Switch includes: sending the flow entries to the logical Switch, so that when a current physical Switch receives the data packet, the current physical Switch processes the data packet by using a current flow table, determines a location of a next flow table according to the mapping information sent by the sending module, and when the determined next flow table is located in the current physical Switch, directs the data packet to the next flow table to continue processing, or when the determined next flow table is located in another physical Switch, initiates pipeline environment protection to generate an encapsulation packet, and sends the encapsulation packet to the physical Switch corresponding to the next flow table.

According to any one of the fourth aspect, or the first or the second possible implementation manner of the fourth aspect, in a fifth possible implementation manner, the sending module includes a determining unit, configured to: when a to-be-sent flow entry includes a flow table jump instruction, determine whether a next flow table is located in the current physical Switch; and an execution unit, configured to: when the determining unit determines that the next flow table is located in the current physical Switch, send the flow entry including the flow table jump instruction to the current physical Switch, so that the current physical Switch directs the data packet to the next flow table to continue processing; or the execution unit, configured to: when the determining unit determines that the next flow table is located in another physical Switch, replace the flow table jump instruction in the to-be-sent flow entry with a Switch forwarding instruction, and send the flow entry including the Switch forwarding instruction to the current physical Switch, so that the current physical Switch initiates pipeline environment protection to generate an encapsulation packet and sends the encapsulation packet to the physical Switch corresponding to the next flow table.

According to the fourth or the fifth possible implementation manner of the fourth aspect, in a sixth possible implementation manner, the pipeline environment protection is that the current physical Switch encapsulates the data packet and related information for processing the data packet into the encapsulation packet, where the related information for processing the data packet includes at least a number ID of the next flow table, and further includes any quantity of the following information: an ingress port (Ingress port), an action set (Action set) currently corresponding to the data packet, and metadata (Metadata).

According to any one of the fourth to the sixth possible implementation manners of the fourth aspect, in a seventh possible implementation manner, the pipeline environment protection is used to enable the physical Switch corresponding to the next flow table to parse the encapsulation packet received by the physical Switch and obtain parsed information, so as to perform pipeline environment recovery according to the parsed information and direct the data packet to the next flow table to continue processing, where the parsed information includes the data packet and the related information for processing the data packet.

According to any one of the fourth to the sixth possible implementation manners of the fourth aspect, in an eighth possible implementation manner, the flow entries corresponding to the extended Switch and sent by the sending module include a flow entry used for performing pipeline recovery; and the sending module is further configured to send the flow entry used for performing pipeline recovery to the extended Switch, so that the extended Switch adds the flow entry to a first flow table table0' of the extended Switch and when the encapsulation packet is received, performs pipeline environment recovery by using the flow entry added to the table0'.

According to the eighth possible implementation manner of the fourth aspect, in a ninth possible implementation manner, the encapsulation packet includes the ID of the next flow table, and the flow entry used for performing pipeline recovery and sent by the sending module includes a match part and an executable instruction, where the match part is used by the extended Switch to take the ID of the next flow table as a match object corresponding to the flow entry, and the executable instruction includes a flow table recovery instruction and/or a flow table jump instruction; and the pipeline environment recovery is that the extended Switch matches, by using the flow entry in the table0', the encapsulation packet received by the extended Switch, and when the ID of the next flow table matches the flow entry in the table0', executes the flow table recovery instruction and/or the flow table jump instruction in the matched flow entry in sequence according to a match result.

According to a fifth aspect, an embodiment of the present invention provides a switch processing apparatus, where the apparatus is disposed in a physical Switch of a logical switch connected to a controller, the logical Switch includes at least two physical Switches, and the at least two physical Switches include a primary Switch and an extended Switch, where the controller is connected to at least the primary Switch, the switch processing apparatus is disposed in the primary Switch, and the apparatus includes:

a receiving module, configured to receive mapping information sent by the controller, where the mapping information includes a mapping relationship between the physical Switch and each flow table in multiple flow tables of the logical Switch; where the receiving module is further configured to receive flow entries sent by the controller, where the flow entries received by the receiving module are content information of each flow table in a flow table set allocated by the controller to the primary Switch or allocated by the controller to the primary Switch and the extended Switch; and a processing module, configured to process, according to the flow entries received by the receiving module or according to the flow entries and the mapping information that are received by the receiving module, a data packet received by the primary Switch.

In a first possible implementation manner of the fifth aspect, the apparatus further includes a sending module, configured to send, after the receiving module receives the mapping relationship sent by the controller, the mapping information to the extended Switch connected to the apparatus; and the sending module is further configured to send, to the extended Switch connected to the apparatus, after the receiving module receives the flow entries sent by the controller, flow entries allocated by the controller.

According to the fifth aspect or the first possible implementation manner of the fifth aspect, in a second possible implementation manner, in the logical Switch to which the primary Switch belongs, the extended Switch includes a first extended Switch and a second extended Switch, the primary Switch is connected to at least the first extended Switch, and the second extended Switch is connected to at least the first extended Switch;

that the sending module is configured to send the mapping information to the extended Switch connected to the apparatus includes: sending the mapping information to the first extended Switch and/or the second extended Switch; and that the sending module is further configured to send, to the extended Switch connected to the apparatus, flow entries allocated by the controller, includes: sending, to the first extended Switch and/or the second extended Switch, flow entries allocated by the controller, so that the extended Switch processes the received data packet according to the mapping information and the flow entries corresponding to the extended Switch.

According to any one of the fifth aspect, or the first or the second possible implementation manner of the fifth aspect, in a third possible implementation manner, the mapping information received by the receiving module includes a flow table allocated by the controller to the primary Switch, where the flow table includes at least a first flow table table0 in the multiple flow tables of the logical Switch; and the processing module is configured to process, by using the table0, the received data packet according to the flow entries received by the receiving module or according to the flow entries and the mapping information that are received by the receiving module.

According to any one of the fifth aspect, or the first to the third possible implementation manners of the fifth aspect, in a fourth possible implementation manner, the processing module includes a processing unit, configured to process the data packet when the data packet is received; and a determining unit, configured to determine a location of a next flow table according to the mapping information received by the receiving module; where the processing unit is further configured to: when the determining unit determines that the next flow table is located in the primary Switch, direct the data packet to the next flow table to continue processing; or the processing unit is further configured to: when the determining unit determines that the next flow table is located in the extended Switch, initiate pipeline environment protection to generate an encapsulation packet, and send the encapsulation packet to the extended Switch corresponding to the next flow table.

According to any one of the fifth aspect, or the first to the third possible implementation manners of the fifth aspect, in a fifth possible implementation manner, that the receiving module is further configured to receive flow entries sent by the controller includes: receiving a flow entry that includes a flow table jump instruction or a Switch forwarding instruction and is sent by the controller, where the flow table jump instruction or the Switch forwarding instruction in the flow entry is determined by the controller according to whether a next flow table in the flow entry is located in the primary Switch, and if yes, the flow entry includes the flow table jump instruction, or if no, the flow entry includes the Switch forwarding instruction; and the processing module is configured to: when the flow entry matching the received data packet includes the flow table jump instruction, direct the data packet to the next flow table to continue processing; or the processing module is configured to: when the flow entry matching the received data packet includes the Switch forwarding instruction, initiate pipeline environment protection to generate an encapsulation packet, and send the encapsulation packet to an extended Switch corresponding to the next flow table.

According to the fourth or the fifth possible implementation manner of the fifth aspect, in a sixth possible implementation manner, that the processing modules initiates pipeline environment protection includes: encapsulating the data packet and related information for processing the data packet into the encapsulation packet, where the related information for processing the data packet includes at least a number ID of the next flow table, and further includes any quantity of the following information: an ingress port (Ingress port), an action set (Action set) currently corresponding to the data packet, and metadata (Metadata).

According to any one of the fourth to the sixth possible implementation manners of the fifth aspect, in a seventh possible implementation manner, the pipeline environment protection is used to enable the extended Switch corresponding to the next flow table to parse the encapsulation packet received by the extended Switch and obtain parsed information, so as to perform pipeline environment recovery according to the parsed information and direct the data packet to the next flow table to continue processing, where the parsed information includes the data packet and the related information for processing the data packet.

According to a sixth aspect, an embodiment of the present invention provides a switch processing apparatus, where the apparatus is disposed in a physical Switch of a logical switch connected to a controller, the logical Switch includes multiple physical Switches, the multiple physical Switches include a primary Switch and the extended Switch, and the extended Switch includes a first extended Switch and a second extended Switch, where the controller is connected to at least the primary Switch, the primary Switch is connected to at least the first extended Switch, the second extended Switch is connected to at least the first extended Switch, the switch processing apparatus is disposed in the extended Switch, and the apparatus includes:

a receiving module, configured to receive mapping information sent by the controller and/or the primary Switch and/or another extended Switch, where the mapping information includes a mapping relationship between the physical Switch and each flow table in multiple flow tables of the logical Switch; where the receiving module is further configured to receive flow entries corresponding to the current extended Switch and sent by the controller and/or the primary Switch and/or the another extended Switch, where the flow entries received by the receiving module are content information of each flow table in a flow table set allocated by the controller to the current extended Switch; and a processing module, configured to process, according to the flow entries received by the receiving module or according to the flow entries and the mapping information that are received by the receiving module, a first encapsulation packet received by the current extended Switch, where the first encapsulation packet is generated by a physical Switch in which a previous flow table is located, by encapsulating a data packet received by the physical Switch and related information for processing the data packet.

In a first possible implementation manner of the sixth aspect, in the mapping information received by the receiving module, a first flow table table0 in the multiple flow tables of the logical Switch corresponds to the primary Switch.

According to the sixth aspect or the first possible implementation manner of the sixth aspect, in a second possible implementation manner, the receiving module is further configured to receive the first encapsulation packet after receiving the flow entries corresponding to the current extended Switch; and the processing module is configured to: when determining that a number ID of a next flow table in the first encapsulation packet received by the receiving module is located in another physical Switch, forward, according to the mapping information received by the receiving module, the first encapsulation packet received by the receiving module to the physical Switch corresponding to the ID of the next flow table.

According to the sixth aspect or the first possible implementation manner of the sixth aspect, in a third possible implementation manner, the receiving module is further configured to receive the first encapsulation packet after receiving the flow entries corresponding to the current extended Switch; and the processing module is configured to: when determining that a number ID of a next flow table in the first encapsulation packet received by the receiving module is located in the current extended Switch, perform pipeline environment recovery on the first encapsulation packet received by the receiving module to obtain the data packet.

According to the third possible implementation manner of the sixth aspect, in a fourth possible implementation manner, the processing module includes: a parsing unit, configured to parse the first encapsulation packet received by the receiving module to obtain parsed information, where the parsed information includes the data packet and the related information for processing the data packet, where the related information for processing the data packet includes at least the ID of the next flow table, and further includes any quantity of the following information: an ingress port (Ingress port), an action set (Action set) currently corresponding to the data packet, and metadata (Metadata); and a processing unit, configured to perform pipeline environment recovery according to the parsed information obtained by the parsing unit, and direct the data packet to the next flow table to continue processing.

According to the third possible implementation manner of the sixth aspect, in a fifth possible implementation manner, the flow entries received by the receiving module include a flow entry used for performing pipeline recovery and sent by the controller; and the processing module includes: an adding unit, configured to add the flow entry used for performing pipeline recovery to a first flow table table0' of the current extended Switch; and a processing unit, configured to perform, by using the flow entry added to the table0', pipeline environment recovery on the first encapsulation packet received by the receiving module.

According to the fifth possible implementation manner of the sixth aspect, in a sixth possible implementation manner, the first encapsulation packet received by the receiving module includes the ID of the next flow table, and the flow entry used for performing pipeline recovery and received by the receiving module includes a match part and an executable instruction, where the executable instruction includes a flow table recovery instruction and/or a flow table jump instruction; and the processing unit is configured to match, by using the flow entry in the table0', the first encapsulation packet received by the receiving module, and when the flow entry in the table0' is matched successfully, execute the flow table recovery instruction and/or the flow table jump instruction in the matched flow entry in sequence according to a match result.

According to any one of the third to the sixth possible implementation manners of the sixth aspect, in a seventh possible implementation manner, the processing module is further configured to: after performing pipeline environment recovery on the first encapsulation packet received by the receiving module, when obtaining the data packet, process the data packet by using the current flow table, and the apparatus further includes a determining module, configured to determine a location of a next flow table according to the mapping information; and the processing module is further configured to: when the determining module determines that the next flow table is located in the current extended Switch, direct the data packet to the next flow table to continue processing; or the processing module is further configured to: when the determining module determines that the next flow table is located in the another extended Switch, initiate pipeline environment protection to generate a second encapsulation packet, and send the second encapsulation packet to the extended Switch corresponding to the next flow table.

According to any one of the third to the sixth possible implementation manners of the sixth aspect, in an eighth possible implementation manner, the receiving module is further configured to receive a flow entry that includes a flow table jump instruction or a Switch forwarding instruction and is sent by the controller, where the flow table jump instruction or the Switch forwarding instruction in the flow entry is determined by the controller according to whether the next flow table in the flow entry is located in the current extended Switch, and if yes, the flow entry includes the flow table jump instruction, or if no, the flow entry includes the Switch forwarding instruction; and the processing module is further configured to: after performing pipeline environment recovery on the first encapsulation packet received by the receiving module, obtain the data packet in the first encapsulation packet, and when the flow entry matching the data packet includes the flow table jump instruction, direct the data packet to the next flow table to continue processing; or obtain the data packet in the first encapsulation packet, and when the flow entry matching the data packet includes the Switch forwarding instruction, initiate pipeline environment protection to generate a second encapsulation packet, and send the second encapsulation packet to an extended Switch corresponding to the next flow table.

According to the seventh or the eighth possible implementation manner of the sixth aspect, in a ninth possible implementation manner, that the processing module is configured to initiate pipeline environment protection includes: encapsulating the data packet and related information for processing the data packet into the second encapsulation packet, where the related information for processing the data packet includes at least an ID of the next flow table, and further includes any quantity of the following information: an ingress port (Ingress port), an action set (Action set) currently corresponding to the data packet, and metadata (Metadata).

According to a seventh aspect, an embodiment of the present invention provides a controller, connected to a logical switch, where the logical Switch includes at least two physical Switches, and the controller includes:

a processor, configured to allocate each flow table in multiple flow tables of the logical Switch to each physical Switch, where the multiple flow tables are a pipeline of the logical Switch; and a transmitter, configured to send mapping information, so that each physical Switch obtains the mapping information, where the mapping information includes a mapping relationship between the physical Switch and each flow table in the multiple flow tables; where the transmitter is further configured to send flow entries to the logical Switch, so that each physical Switch obtains flow entries corresponding to each physical switch and processes a received data packet according to the flow entries or according to the flow entries and the mapping information, where the flow entries are content information of each flow table in a flow table set allocated by the controller to each physical Switch.

In a first possible implementation manner of the seventh aspect, the at least two physical Switches include a primary Switch and a first extended Switch, where the controller is connected to at least the primary Switch, and the first extended Switch is connected to at least the primary Switch;

that the transmitter is configured to send mapping information includes: sending the mapping information to at least the primary Switch, so that the primary Switch receives the mapping information and that the mapping information received by the first extended Switch includes the mapping information sent by the controller and/or the primary Switch; and that the transmitter is further configured to send flow entries to the logical Switch includes: sending the flow entries of the logical Switch to at least the primary Switch, so that the flow entries received by the primary Switch include flow entries corresponding to the primary Switch or flow entries corresponding to each physical Switch and that flow entries received by the first extended Switch include flow entries sent by the controller and/or the primary Switch.

According to the first possible implementation manner of the seventh aspect, in a second possible implementation manner, the physical Switches further include a second extended Switch, and the second extended Switch is connected to at least the first extended Switch;

that the transmitter is configured to send mapping information includes: sending the mapping information to at least the primary Switch, so that the primary Switch receives the mapping information, the mapping information received by the first extended Switch includes the mapping information sent by the controller and/or the primary Switch, and the mapping information received by the second extended Switch includes the mapping information sent by the controller and/or the primary Switch and/or the first extended Switch; and that the transmitter is further configured to send flow entries to the logical Switch includes: sending the flow entries of the logical Switch to at least the primary Switch, so that the flow entries received by the primary Switch include flow entries corresponding to the primary Switch or flow entries corresponding to the primary Switch and flow entries corresponding to the first extended Switch and/or the second extended Switch, flow entries received by the first extended Switch include flow entries corresponding to the first extended Switch and sent by the controller and/or the primary Switch, and flow entries received by the second extended Switch include flow entries corresponding to the second extended Switch and sent by the controller and/or the primary Switch and/or the first extended Switch.

According to the first or the second possible implementation manner of the seventh aspect, in a third possible implementation manner, a flow table allocated by the processor to the primary Switch includes at least a first flow table table0 in the multiple flow tables of the logical Switch, so that when the primary Switch receives the data packet, the primary Switch processes the data packet by using the table0.

According to any one of the seventh aspect, or the first or the second possible implementation manner of the seventh aspect, in a fourth possible implementation manner, that the transmitter is further configured to send flow entries to the logical Switch includes: sending the flow entries to the logical Switch, so that when a current physical Switch receives the data packet, the current physical Switch processes the data packet by using a current flow table, determines, according to the mapping information sent by the transmitter, whether a next flow table is located in the current physical Switch, and if yes, directs the data packet to the next flow table to continue processing, or if no, initiates pipeline environment protection to generate an encapsulation packet, and sends the encapsulation packet to a physical Switch corresponding to the next flow table.

According to any one of the seventh aspect, or the first or the second possible implementation manner of the seventh aspect, in a fifth possible implementation manner, that the transmitter is further configured to send flow entries to the logical Switch includes: when a to-be-sent flow entry includes a flow table jump instruction, determining whether a next flow table is located in the current physical Switch; and if yes, sending the flow entry including the flow table jump instruction to the current physical Switch, so that the current physical Switch directs the data packet to the next flow table to continue processing; or if no, replacing the flow table jump instruction in the to-be-sent flow entry with a Switch forwarding instruction, and sending the flow entry including the Switch forwarding instruction to the current physical Switch, so that the current physical Switch initiates pipeline environment protection to generate an encapsulation packet and sends the encapsulation packet to a physical Switch corresponding to the next flow table.

According to the fourth or the fifth possible implementation manner of the seventh aspect, in a sixth possible implementation manner, the pipeline environment protection is that the current physical Switch encapsulates the data packet and related information for processing the data packet into the encapsulation packet, where the related information for processing the data packet includes at least a number ID of the next flow table, and further includes any quantity of the following information: an ingress port (Ingress port), an action set (Action set) currently corresponding to the data packet, and metadata (Metadata).

According to any one of the fourth to the sixth possible implementation manners of the seventh aspect, in a seventh possible implementation manner, the pipeline environment protection is used to enable the physical Switch corresponding to the next flow table to parse the encapsulation packet received by the physical Switch and obtain parsed information, so as to perform pipeline environment recovery according to the parsed information and direct the data packet to the next flow table to continue processing, where the parsed information includes the data packet and the related information for processing the data packet.

According to any one of the fourth to the sixth possible implementation manners of the seventh aspect, in an eighth possible implementation manner, the flow entries corresponding to the extended Switch and sent by the transmitter include a flow entry used for performing pipeline recovery; and the transmitter is further configured to send the flow entry used for performing pipeline recovery to the extended Switch, so that the extended Switch adds the flow entry to a first flow table table0' of the extended Switch and when the encapsulation packet is received, performs pipeline environment recovery by using the flow entry added to the table0'.

According to the eighth possible implementation manner of the seventh aspect, in a ninth possible implementation manner, the encapsulation packet includes the ID of the next flow table, and the flow entry used for performing pipeline recovery and sent by the transmitter includes a match part and an executable instruction, where the match part is used by the extended Switch to take the ID of the next flow table as a match object corresponding to the flow entry, and the executable instruction includes a flow table recovery instruction and/or a flow table jump instruction; and the pipeline environment recovery is that the extended Switch matches, by using the flow entry in the table0', the encapsulation packet received by the extended Switch, and when the ID of the next flow table matches the flow entry in the table0', executes the flow table recovery instruction and/or the flow table jump instruction in the matched flow entry in sequence according to a match result.

According to an eighth aspect, an embodiment of the present invention provides a primary switch, where the primary switch is a physical Switch of a logical Switch connected to a controller, the logical Switch includes at least two physical Switches, and the at least two physical Switches include the primary Switch and an extended Switch, where the controller is connected to at least the primary Switch, and the primary Switch includes:

a receiver, configured to receive mapping information sent by the controller, where the mapping information includes a mapping relationship between the physical Switch and each flow table in multiple flow tables of the logical Switch; where the receiver is further configured to receive flow entries sent by the controller, where the flow entries received by the receiver are content information of each flow table in a flow table set allocated by the controller to the primary Switch or allocated by the controller to the primary Switch and the extended Switch; and a processor, configured to process, according to the flow entries received by the receiver or according to the flow entries and the mapping information that are received by the receiver, a data packet received by the primary Switch.

In a first possible implementation manner of the eighth aspect, the primary switch further includes a transmitter, further configured to send, after the receiver receives the mapping relationship sent by the controller, the mapping information to the extended Switch connected to the primary switch; and the transmitter is further configured to send, to the extended Switch connected to the primary switch, after the receiver receives the flow entries sent by the controller, flow entries allocated by the controller.

According to the eighth aspect or the first possible implementation manner of the eighth aspect, in a second possible implementation manner, in the logical Switch to which the primary Switch belongs, the extended Switch includes a first extended Switch and a second extended Switch, the primary Switch is connected to at least the first extended Switch, and the second extended Switch is connected to at least the first extended Switch;

that the transmitter is configured to send the mapping information to the extended Switch connected to the primary switch includes: sending the mapping information to the first extended Switch and/or the second extended Switch; and that the transmitter is further configured to send, to the extended Switch connected to the primary switch, flow entries allocated by the controller, includes: sending, to the first extended Switch and/or the second extended Switch, flow entries allocated by the controller, so that the extended Switch processes the received data packet according to the mapping information and the flow entries corresponding to the extended Switch.

According to any one of the eighth aspect, or the first or the second possible implementation manner of the eighth aspect, in a third possible implementation manner, the mapping information received by the receiver includes a flow table allocated by the controller to the primary Switch, where the flow table includes at least a first flow table table0 in the multiple flow tables of the logical Switch; and the processor is configured to process, by using the table0, the received data packet according to the flow entries received by the receiver or according to the flow entries and the mapping information that are received by the receiver.

According to any one of the eighth aspect, or the first to the third possible implementation manners of the eighth aspect, in a fourth possible implementation manner, the processor is configured to process the data packet when the data packet is received; determine, according to the mapping information received by the receiver, whether a next flow table is located in the primary Switch; and if yes, direct the data packet to the next flow table to continue processing; or if no, initiate pipeline environment protection to generate an encapsulation packet, and send the encapsulation packet to an extended Switch corresponding to the next flow table.

According to any one of the eighth aspect, or the first to the third possible implementation manners of the eighth aspect, in a fifth possible implementation manner, that the receiver is further configured to receive flow entries sent by the controller includes: receiving a flow entry that includes a flow table jump instruction or a Switch forwarding instruction and is sent by the controller, where the flow table jump instruction or the Switch forwarding instruction in the flow entry is determined by the controller according to whether a next flow table in the flow entry is located in the primary Switch, and if yes, the flow entry includes the flow table jump instruction, or if no, the flow entry includes the Switch forwarding instruction; and the processor is configured to: when the flow entry matching the received data packet includes the flow table jump instruction, direct the data packet to the next flow table to continue processing; or the processor is configured to: when the flow entry matching the received data packet includes the Switch forwarding instruction, initiate pipeline environment protection to generate an encapsulation packet, and send the encapsulation packet to an extended Switch corresponding to the next flow table.

According to the fourth or the fifth possible implementation manner of the eighth aspect, in a sixth possible implementation manner, that the processor initiates pipeline environment protection includes: encapsulating the data packet and related information for processing the data packet into the encapsulation packet, where the related information for processing the data packet includes at least a number ID of the next flow table, and further includes any quantity of the following information: an ingress port (Ingress port), an action set (Action set) currently corresponding to the data packet, and metadata (Metadata).

According to any one of the fourth to the sixth possible implementation manners of the eighth aspect, in a seventh possible implementation manner, the pipeline environment protection is used to enable the extended Switch corresponding to the next flow table to parse the encapsulation packet received by the extended Switch and obtain parsed information, so as to perform pipeline environment recovery according to the parsed information and direct the data packet to the next flow table to continue processing, where the parsed information includes the data packet and the related information for processing the data packet.

According to a ninth aspect, an embodiment of the present invention provides an extended switch, where the extended switch is a physical Switch of a logical Switch connected to a controller, the logical Switch includes multiple physical Switches, the multiple physical Switches include a primary Switch and the extended Switch, and the extended Switch includes a first extended Switch and a second extended Switch, where the controller is connected to at least the primary Switch, the primary Switch is connected to at least the first extended Switch, the second extended Switch is connected to at least the first extended Switch, and the extended switch includes:

a receiver, configured to receive mapping information sent by the controller and/or the primary Switch and/or another extended Switch, where the mapping information includes a mapping relationship between the physical Switch and each flow table in multiple flow tables of the logical Switch; where the receiver is further configured to receive flow entries corresponding to the current extended Switch and sent by the controller and/or the primary Switch and/or the another extended Switch, where the flow entries received by the receiver are content information of each flow table in a flow table set allocated by the controller to the current extended Switch; and a processor, configured to process, according to the flow entries received by the receiver or according to the flow entries and the mapping information that are received by the receiver, a first encapsulation packet received by the current extended Switch, where the first encapsulation packet is generated by a physical Switch in which a previous flow table is located, by encapsulating a data packet received by the physical Switch and related information for processing the data packet.

In a first possible implementation manner of the ninth aspect, in the mapping information received by the receiver, a first flow table table0 in the multiple flow tables of the logical Switch corresponds to the primary Switch.

According to the ninth aspect or the first possible implementation manner of the ninth aspect, in a second possible implementation manner, the receiver is further configured to receive the first encapsulation packet after receiving the flow entries corresponding to the current extended Switch; and the processor is configured to: when determining that a number ID of a next flow table in the first encapsulation packet received by the receiver is located in another physical Switch, forward, according to the mapping information received by the receiver, the first encapsulation packet received by the receiver to the physical Switch corresponding to the ID of the next flow table.

According to the ninth aspect or the first possible implementation manner of the ninth aspect, in a third possible implementation manner, the receiver is further configured to receive the first encapsulation packet after receiving the flow entries corresponding to the current extended Switch; and the processor is configured to: when determining that a number ID of a next flow table in the first encapsulation packet received by the receiver is located in the current extended Switch, perform pipeline environment recovery on the first encapsulation packet received by the receiver to obtain the data packet.

According to the third possible implementation manner of the ninth aspect, in a fourth possible implementation manner, the processor is configured to: parse the first encapsulation packet received by the receiver to obtain parsed information, where the parsed information includes the data packet and the related information for processing the data packet, where the related information for processing the data packet includes at least the ID of the next flow table, and further includes any quantity of the following information: an ingress port (Ingress port), an action set (Action set) currently corresponding to the data packet, and metadata (Metadata); and perform pipeline environment recovery according to the parsed information, and direct the data packet to the next flow table to continue processing.

According to the third possible implementation manner of the ninth aspect, in a fifth possible implementation manner, the flow entries received by the receiver include a flow entry used for performing pipeline recovery and sent by the controller; and the processor is configured to add the flow entry used for performing pipeline recovery to a first flow table table0' of the current extended Switch, and perform, by using the flow entry added to the table0', pipeline environment recovery on the first encapsulation packet received by the receiver.

According to the fifth possible implementation manner of the ninth aspect, in a sixth possible implementation manner, the first encapsulation packet received by the receiver includes the ID of the next flow table, and the flow entry used for performing pipeline recovery and received by the receiver includes a match part and an executable instruction, where the executable instruction includes a flow table recovery instruction and/or a flow table jump instruction; and that the processor is configured to perform, by using the flow entry added to the table0', pipeline environment recovery on the first encapsulation packet received by the receiver, includes: matching, by using the flow entry in the table0', the first encapsulation packet received by the receiver; and when the flow entry in the table0' is matched successfully, executing the flow table recovery instruction and/or the flow table jump instruction in the matched flow entry in sequence according to a match result.

According to any one of the third to the sixth possible implementation manners of the ninth aspect, in a seventh possible implementation manner, the processor is further configured to: after performing pipeline environment recovery on the first encapsulation packet received by the receiver, when obtaining the data packet, process the data packet by using the current flow table; and the processor is further configured to: determine, according to the mapping information, whether a next flow table is located in the current extended Switch; and if yes, direct the data packet to the next flow table to continue processing; or if no, initiate pipeline environment protection to generate a second encapsulation packet, and send the second encapsulation packet to an extended Switch corresponding to the next flow table.

According to any one of the third to the sixth possible implementation manners of the ninth aspect, in an eighth possible implementation manner, the receiver is further configured to receive a flow entry that includes a flow table jump instruction or a Switch forwarding instruction and is sent by the controller, where the flow table jump instruction or the Switch forwarding instruction in the flow entry is determined by the controller according to whether the next flow table in the flow entry is located in the current extended Switch, and if yes, the flow entry includes the flow table jump instruction, or if no, the flow entry includes the Switch forwarding instruction; and the processor is further configured to: after performing pipeline environment recovery on the first encapsulation packet received by the receiver, obtain the data packet in the first encapsulation packet, and when the flow entry matching the data packet includes the flow table jump instruction, direct the data packet to the next flow table to continue processing; or obtain the data packet in the first encapsulation packet, and when the flow entry matching the data packet includes the Switch forwarding instruction, initiate pipeline environment protection to generate a second encapsulation packet, and send the second encapsulation packet to an extended Switch corresponding to the next flow table.

According to the seventh or the eighth possible implementation manner of the ninth aspect, in a ninth possible implementation manner, that the processor is configured to initiate pipeline environment protection includes: encapsulating the data packet and related information for processing the data packet into the second encapsulation packet, where the related information for processing the data packet includes at least an ID of the next flow table, and further includes any quantity of the following information: an ingress port (Ingress port), an action set (Action set) currently corresponding to the data packet, and metadata (Metadata).

According to a tenth aspect, an embodiment of the present invention provides a switch processing system, including a controller and a logical Switch, where the logical Switch includes at least two physical Switches, and the system includes:

the controller is configured to allocate each flow table in multiple flow tables of the logical Switch to each physical Switch, where the multiple flow tables are a pipeline of the logical Switch;

the controller is further configured to send mapping information, where the mapping information includes a mapping relationship between the physical Switch and each flow table in the multiple flow tables of the logical Switch;

each physical Switch is configured to receive the mapping information;

the controller is further configured to send flow entries to the logical Switch;

each physical Switch is further configured to receive the flow entries, where the flow entries are content information of each flow table in a flow table set allocated by the controller to each physical Switch; and each physical Switch is further configured to process, according to the flow entries or according to the flow entries and the mapping information, a data packet received by the physical Switch.

In a first possible implementation manner of the tenth aspect, the at least two physical Switches include a primary Switch and an extended Switch, where the controller is connected to at least the primary Switch, and the extended Switch is connected to at least the primary Switch;

that the controller is configured to send mapping information includes: sending the mapping information to at least the primary Switch;

the primary Switch is further configured to send, after receiving the mapping relationship sent by the controller, the mapping information to the extended Switch connected to the primary Switch;

that the controller is further configured to send flow entries to the logical Switch includes: sending the flow entries of the logical Switch to at least the primary Switch, where the flow entries received by the primary Switch include flow entries corresponding to the primary Switch or flow entries corresponding to each physical Switch; and the primary Switch is further configured to send, to the extended Switch connected to the primary Switch, after receiving the flow entries sent by the controller, flow entries allocated by the controller.

According to the tenth aspect or the first possible implementation manner of the tenth aspect, in a second possible implementation manner, the extended Switch includes a first extended Switch and a second extended Switch, the primary Switch is connected to at least the first extended Switch, and the second extended Switch is connected to at least the first extended Switch;

that the primary Switch is configured to send the mapping information to the extended Switch connected to the primary Switch includes: sending the mapping information to the first extended Switch and/or the second extended Switch; and that the primary Switch is configured to send, to the extended Switch connected to the primary Switch, flow entries allocated by the controller, includes: sending, to the first extended Switch and/or the second extended Switch, flow entries allocated by the controller.

According to the second possible implementation manner of the tenth aspect, in a third possible implementation manner, that each extended Switch is configured to receive the mapping information includes: the first extended Switch is configured to receive the mapping information sent by the controller and/or the primary Switch; the second extended Switch is configured to receive the mapping information sent by the controller and/or the primary Switch and/or the first extended Switch; and that each extended Switch is configured to receive the flow entries includes: the first extended Switch is configured to receive the flow entries sent by the controller and/or the primary Switch; and the second extended Switch is configured to receive the flow entries sent by the controller and/or the primary Switch and/or the first extended Switch.

According to any one of the tenth aspect, or the first to the third possible implementation manners of the tenth aspect, in a fourth possible implementation manner, a flow table allocated by the controller to the primary Switch includes at least a first flow table table0 in the multiple flow tables of the logical Switch; and that the primary Switch is configured to process the data packet received by the primary Switch includes: processing the received data packet according to the flow entries or according to the flow entries and the mapping information by using the table0.

According to any one of the tenth aspect, or the first to the fourth possible implementation manners of the tenth aspect, in a fifth possible implementation manner, that the primary Switch processes the data packet received by the primary Switch includes: processing the data packet when receiving the data packet; determining, according to the mapping information, whether a next flow table is located in the primary Switch; and if yes, directing the data packet to the next flow table to continue processing; or if no, initiating pipeline environment protection to generate a first encapsulation packet, and sending the first encapsulation packet to an extended Switch corresponding to the next flow table.

According to any one of the tenth aspect, or the first to the fourth possible implementation manners of the tenth aspect, in a sixth possible implementation manner, that the controller is configured to send flow entries to the primary Switch includes: when a to-be-sent flow entry includes a flow table jump instruction, determining whether a next flow table is located in the primary Switch; and if yes, sending the flow entry including the flow table jump instruction to the primary Switch; or if no, replacing the flow table jump instruction in the to-be-sent flow entry with a Switch forwarding instruction, and sending the flow entry including the Switch forwarding instruction to the primary Switch;

correspondingly, that the primary Switch is configured to receive the flow entries includes: receiving the flow entry that includes the flow table jump instruction or the Switch forwarding instruction and is sent by the controller; and that the primary Switch is configured to process the data packet received by the primary Switch includes: when the flow entry matching the received data packet includes the flow table jump instruction, directing the data packet to the next flow table to continue processing; or when the flow entry matching the received data packet includes the Switch forwarding instruction, initiating pipeline environment protection to generate a first encapsulation packet, and sending the first encapsulation packet to an extended Switch corresponding to the next flow table.

According to the fifth or the sixth possible implementation manner of the tenth aspect, in a seventh possible implementation manner, that the primary Switch is configured to initiate pipeline environment protection includes: the primary Switch encapsulates the data packet and related information for processing the data packet into the first encapsulation packet, where the related information for processing the data packet includes at least a number ID of the next flow table, and further includes any quantity of the following information: an ingress port (Ingress port), an action set (Action set) currently corresponding to the data packet, and metadata (Metadata).

According to any one of the tenth aspect, or the first to the seventh possible implementation manners of the tenth aspect, in an eighth possible implementation manner, the current extended Switch is further configured to receive the first encapsulation packet after receiving the flow entries corresponding to the current extended Switch; and the current extended Switch is further configured to determine whether the number ID of the next flow table in the first encapsulation packet is located in the current extended Switch, and if no, forward, according to the mapping information, the first encapsulation packet to a physical Switch corresponding to the ID of the next flow table; or if yes, perform pipeline environment recovery on the first encapsulation packet to obtain the data packet.

According to the eighth possible implementation manner of the tenth aspect, in a ninth possible implementation manner, that the current extended Switch is configured to perform pipeline environment recovery on the first encapsulation packet includes: parsing the first encapsulation packet to obtain parsed information, where the parsed information includes the data packet and the related information for processing the data packet; and performing pipeline environment recovery according to the parsed information, and directing the data packet to the next flow table to continue processing.

According to the eighth possible implementation manner of the tenth aspect, in a tenth possible implementation manner, the flow entries received by the current extended Switch include a flow entry used for performing pipeline recovery and sent by the controller; and the current extended Switch is further configured to add the flow entry used for performing pipeline recovery to a first flow table table0' of the current extended Switch, and perform, by using the flow entry added to the table0', pipeline environment recovery on the first encapsulation packet.

According to the tenth possible implementation manner of the tenth aspect, in an eleventh possible implementation manner, the first encapsulation packet received by the current extended Switch includes the ID of the next flow table, and the flow entry used for performing pipeline recovery and received by the current extended Switch includes a match part and an executable instruction, where the executable instruction includes a flow table recovery instruction and/or a flow table jump instruction; and that the current extended Switch is configured to perform, by using the flow entry added to the table0', pipeline environment recovery on the first encapsulation packet, includes: matching, by using the flow entry in the table0', the first encapsulation packet received by the receiver; and when the flow entry in the table0' is matched successfully, executing the flow table recovery instruction and/or the flow table jump instruction in the matched flow entry in sequence according to a match result.

According to any one of the eighth to the eleventh possible implementation manners of the tenth aspect, in a twelfth possible implementation manner, the current extended Switch is further configured to: after performing pipeline environment recovery on the first encapsulation packet, when obtaining the data packet, process the data packet by using the current flow table; and the current extended Switch is further configured to: determine, according to the mapping information, whether a next flow table is located in the current extended Switch; and if yes, direct the data packet to the next flow table to continue processing; or if no, initiate pipeline environment protection to generate a second encapsulation packet, and send the second encapsulation packet to an extended Switch corresponding to the next flow table.

According to any one of the eighth to the eleventh possible implementation manners of the tenth aspect, in a thirteenth possible implementation manner, that the controller is configured to send flow entries to the current extended Switch includes: when a to-be-sent flow entry includes a flow table jump instruction, determining whether a next flow table is located in the current extended Switch; and if yes, sending the flow entry including the flow table jump instruction to the current extended Switch; or if no, replacing the flow table jump instruction in the to-be-sent flow entry with a Switch forwarding instruction, and sending the flow entry including the Switch forwarding instruction to the current extended Switch;

correspondingly, that the current extended Switch is configured to receive the flow entries includes: receiving the flow entry that includes the flow table jump instruction or the Switch forwarding instruction and is sent by the controller; and the current extended Switch is further configured to: after performing pipeline environment recovery on the first encapsulation packet, obtain the data packet in the first encapsulation packet, and process the obtained data packet by using the current flow table.

According to the thirteenth possible implementation manner of the tenth aspect, in a fourteenth possible implementation manner, that the current extended Switch is configured to process the obtained data packet includes: when the flow entry matching the obtained data packet includes the flow table jump instruction, directing the data packet to the next flow table to continue processing; or when the flow entry matching the obtained data packet includes the Switch forwarding instruction, initiating pipeline environment protection to generate a second encapsulation packet, and sending the second encapsulation packet to an extended Switch corresponding to the next flow table.

According to any one of the twelfth to the fourteenth possible implementation manners of the tenth aspect, in a fifteenth possible implementation manner, that the current extended Switch is configured to initiate pipeline environment protection includes: encapsulating the data packet and related information for processing the data packet into the second encapsulation packet, where the related information for processing the data packet includes at least an ID of the next flow table, and further includes any quantity of the following information: an ingress port (Ingress port), an action set (Action set) currently corresponding to the data packet, and metadata (Metadata).

In the switch processing method, controller, switch, and switch processing system that are provided by the present invention, the switch processing method is executed by the controller and a logical Switch, where the logical Switch includes at least two physical Switches. The controller allocates each flow table in multiple flow tables of the logical Switch to each physical Switch, and sends mapping information and flow entries, so that each physical Switch obtains the mapping information and flow entries corresponding to the physical Switch. Further, each physical Switch may process a received data packet according to the obtained flow entries and a mapping relationship or according to the flow entries. In the switch processing system for executing the switch processing method provided by the present invention, new physical Switches may be stacked on a basis of a physical structure of the logical Switch. This helps to maintain stability of an existing network topology, improves a processing capability of the logical Switch, and reduces impact on network running and costs of capacity expansion.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A switch processing method provided by an embodiment of the present invention may be applied to a case in which a quantity of flow tables supported by a logical Switch in a network and a scale of flow entries that can be processed by the logical Switch need to be expanded. Specifically, in the switch processing method provided by this embodiment of the present invention, a controller may allocate each flow table in multiple flow tables to multiple physical Switches, and the multiple physical Switches should be considered as one logical Switch. Therefore, a pipeline of the logical Switch can support a large quantity of flow tables, and/or may process a large quantity of flow entries. The switch processing method provided by this embodiment may be executed by a switch processing system. The switch processing system includes a controller and multiple physical Switches. A data processing apparatus may be integrated in the controller and each physical Switch, and the data processing apparatus may be implemented by using software and/or hardware. The following describes in detail the switch processing method provided by this embodiment.

Embodiment 1

Figure 1:
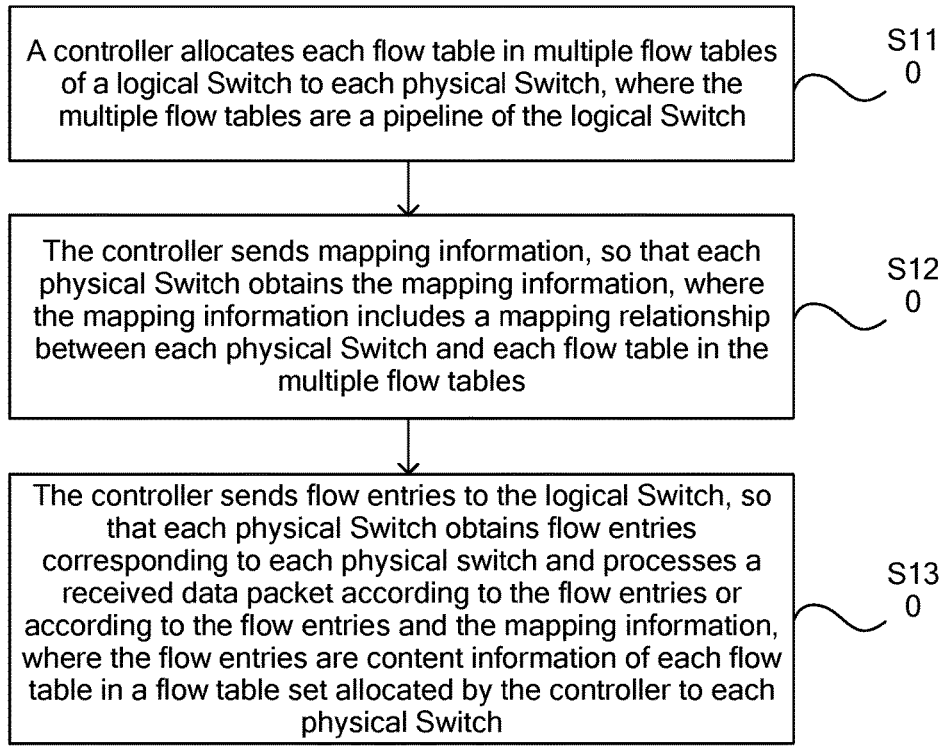
FIG. 1 is a flowchart of a switch processing method according to Embodiment 1 of the present invention.

FIG. 1 is a flowchart of a switch processing method according to Embodiment 1 of the present invention. The switch processing method provided by this embodiment is executed by a controller and a logical Switch, where the logical Switch includes at least two physical Switches. As shown in FIG. 1, the method in this embodiment includes the following steps:

S110. The controller allocates each flow table in multiple flow tables of the logical Switch to each physical Switch, where the multiple flow tables are a pipeline of the logical Switch.

S120. The controller sends mapping information, so that each physical Switch obtains the mapping information, where the mapping information includes a mapping relationship between each physical Switch and each flow table in the multiple flow tables.

In this embodiment, the logical Switch includes at least two physical Switches. Therefore, the controller needs to allocate each flow table in the multiple flow tables to different physical Switches for sharing, and further needs to deliver the mapping relationship between each physical Switch and each flow table to the physical Switches that participate in processing, so that each physical Switch may forward, after processing a received data packet by using an allocated current flow table, the data packet to a subsequent flow table or another physical Switch to continue processing.

S130. The controller sends flow entries to the logical Switch, so that each physical Switch obtains flow entries corresponding to each physical switch and processes a received data packet according to the flow entries or according to the flow entries and the mapping information, where the flow entries are content information of each flow table in a flow table set allocated by the controller to each physical Switch.

In this embodiment, the controller allocates each flow table in the multiple flow tables to each physical Switch, and after delivering the mapping relationship, needs to deliver, to each physical Switch, flow entries of the flow table allocated to the physical Switch. The flow entries received by each physical Switch are the content information of each flow table in the flow table set allocated by the controller to each physical Switch, for example, including a match part (Match Fields), a priority (Priority), statistical data (Counters), instructions (Instructions), timeouts (Timeouts), and a flow table associated value (Cookie). Therefore, each physical Switch fills the received flow entries in the flow table corresponding to the physical Switch, and may process the received data packet after the physical Switch knows the allocated flow table, the mapping relationship, and the flow entries in each flow table.

Figure 2:
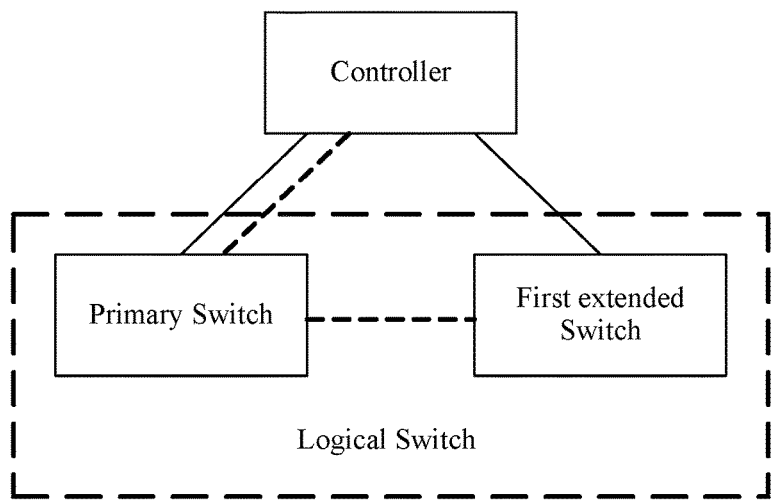
FIG. 2 is a schematic diagram of an application scenario according to the embodiment shown in FIG. 1.

For example, FIG. 2 is a schematic diagram of an application scenario according to the embodiment shown in FIG. 1. In the scenario shown in FIG. 2, the logical Switch includes two physical Switches, and the physical Switches include a primary Switch and a first extended Switch. The controller is connected to at least the primary Switch, and the first extended Switch is connected to at least the primary Switch. In an architecture shown in FIG. 2, a manner of sending the mapping information and flow entries by the controller may be: (1) The controller directly sends the mapping information and the flow entries corresponding to each physical Switch to the corresponding physical Switch, that is, the controller needs to be connected to each physical Switch, corresponding to a connection relationship shown by a solid line in FIG. 2. (2) The controller sends the mapping information and all the flow entries to the primary Switch, and therefore, the flow entries received by the primary Switch not only include flow entries corresponding to the primary Switch, but also include flow entries corresponding to the first extended Switch, and the primary Switch sends the mapping information and the flow entries corresponding to the first extended Switch to the first extended Switch. In this sending manner, the first extended Switch may be connected to only the primary Switch, corresponding to a connection relationship shown by a dashed line in FIG. 2. Generally, the manner of sending the mapping information and flow entries by the controller may include the foregoing two cases, that is, a connection relationship between each physical Switch and the controller meets any one of the foregoing conditions.

Figure 3:
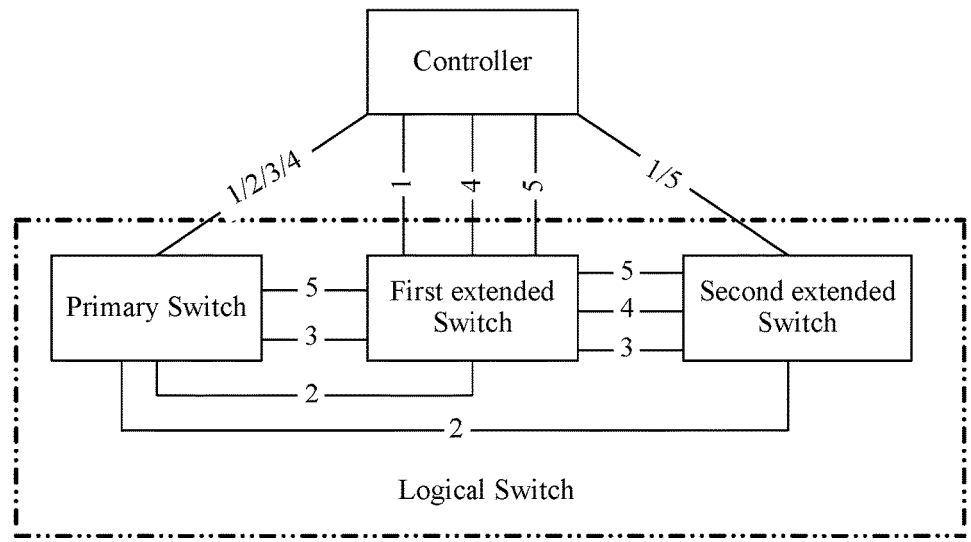
FIG. 3 is a schematic diagram of another application scenario according to the embodiment shown in FIG. 1.

For another example, FIG. 3 is a schematic diagram of another application scenario according to the embodiment shown in FIG. 1. In the scenario shown in FIG. 3, the logical Switch includes three physical Switches, and the physical Switches include a primary Switch, a first extended Switch, and a second extended Switch. A manner of connection between the primary Switch and the first extended Switch is similar to that in the scenario shown in FIG. 2, and the second extended Switch is connected to at least the first extended Switch. In an architecture shown in FIG. 3, a manner of sending the mapping information and flow entries by the controller may be: (1) The controller directly sends the mapping information and the flow entries corresponding to each physical Switch to the corresponding physical Switch, that is, the controller needs to be connected to each physical Switch, corresponding to a connection relationship shown by a solid line "1" in FIG. 3. (2) The controller sends the mapping information and all the flow entries to the primary Switch, that is, the flow entries received by the primary Switch not only include flow entries corresponding to the primary Switch, but also include flow entries corresponding to other extended Switches, and further, the primary Switch sends the mapping information and the flow entries corresponding to the other physical Switches to the corresponding physical Switches. In this sending manner, the controller is connected to only the primary Switch, and both the first extended Switch and the second extended Switch are connected to the primary Switch, corresponding to a connection relationship shown by a solid line "2" in FIG. 3. (3) The controller sends the mapping information and all the flow entries to the primary Switch, and the primary Switch sends the mapping information and flow entries corresponding to other physical Switches to only the first extended Switch, where the flow entries received by the first extended Switch not only include flow entries corresponding to the first extended Switch, but also include flow entries corresponding to the second extended Switch; and further, the first extended Switch sends the mapping information and the flow entries corresponding to the second extended Switch to the corresponding second extended Switch. In this sending manner, the controller and the first extended Switch are connected to the primary Switch, and the second extended Switch is connected to only the first extended Switch, corresponding to a connection relationship shown by a solid line "3" in FIG. 3. (4) The controller may also send the mapping information and flow entries corresponding to the primary Switch to the primary Switch, and send the mapping information and flow entries corresponding to both extended Switches to the first extended Switch; and further, the first extended Switch sends the mapping information and flow entries corresponding to the second extended Switch to the second extended Switch. In this sending manner, both the first extended Switch and the primary Switch are connected to the controller, and the second extended Switch is connected to only the first extended Switch, corresponding to a connection relationship shown by a solid line "4" in FIG. 3. In addition, the controller may also first send the mapping information and flow entries to the extended Switches. For example, the controller sends the mapping information and flow entries to the first extended Switch, where the flow entries include flow entries corresponding to the primary Switch and flow entries corresponding to the extended Switches; the first extended Switch forwards the mapping information and the flow entries corresponding to the primary Switch to the primary Switch; and the mapping information received by the second extended Switch may be sent by the controller and/or the first extended Switch. In this sending manner, the first extended Switch is connected to the controller and the primary Switch, and the second extended Switch is connected to the first extended Switch and/or the controller. Generally, the manner of sending the mapping information and flow entries by the controller may include a plurality of the foregoing cases, that is, a connection relationship between each physical Switch and the controller meets any one of the foregoing conditions. In the switch processing method provided by the present invention, a specific process of sending the mapping information and flow entries by the controller is not limited. Any sending manner that may enable each physical Switch to receive the mapping information and the flow entries corresponding to each physical Switch may be applicable to the switch processing method provided by this embodiment of the present invention.

It should be noted that, FIG. 2 and FIG. 3 are also schematic structural diagrams of the switch processing system provided by this embodiment of the present invention. In this system, the primary Switch is a switch determined in a network and connected to the controller. In addition, a flow table allocated by the controller to the primary Switch includes at least a first flow table (table0) in the multiple flow tables of the logical Switch, so that when the primary Switch receives the data packet, the primary Switch first processes the data packet by using the table0. Other physical Switches receive and forward the mapping information and flow entries based on connection relationships with the primary Switch and connection relationships between upper-level and lower-level physical Switches.

In the prior art, when an operator needs to perform capacity expansion in terms of functions or performance for a Switch disposed in a network node, due to a limitation of a hardware capability of the Switch, the operator can only replace an unscalable Switch in an existing network. Therefore, costs of network capacity expansion are relatively high. In comparison, in this embodiment, the logical Switch is not an unscalable physical Switch, but includes multiple physical Switches that are stacked. Therefore, when a network capacity is expanded, or service traffic increases, or the logical Switch is required to complete more complex logic processing functions, an operator can still continue to use the current existing physical Switches, and a new logical Switch is formed by stacking multiple existing physical Switches to achieve an objective of capacity expansion. Therefore, it is unnecessary to purchase a device with a larger capacity to replace an old device. This fully guarantees investment of the operator on the existing device, and reduces costs of capacity expansion. In specific implementation, because an entirety of an original device and an extended device may be considered as a logical entity that is completely equivalent to the original device in a network topology, the network topology can keep stable before and after an upgrade by using this method. Therefore, a smooth node-level upgrade is implemented in an SDN domain with low complexity and high reliability. Specifically, in the method provided by this embodiment, first, a quantity of physical Switches in the logical Switch can be extended, so that a processing capability of the logical Switch is increased. When complex logic cannot be processed due to a limitation of a quantity of flow tables that can be supported by the existing logical Switch, a physical Switch added during capacity expansion and the existing physical Switch may be used together to form a new logical Switch, that is, form a logical Switch after capacity expansion. Further, a capability of processing complex logic by the logical Switch after capacity expansion is improved. When a computation processing capability of the existing logical Switch is insufficient, the logical Switch after capacity expansion is used to execute the switch processing method provided by this embodiment, so as to maintain the existing network topology to implement a smooth upgrade, while improving the computation processing capability. Therefore, capacity expansion is easier to implement, and impact on network running is reduced.

Figure 4:
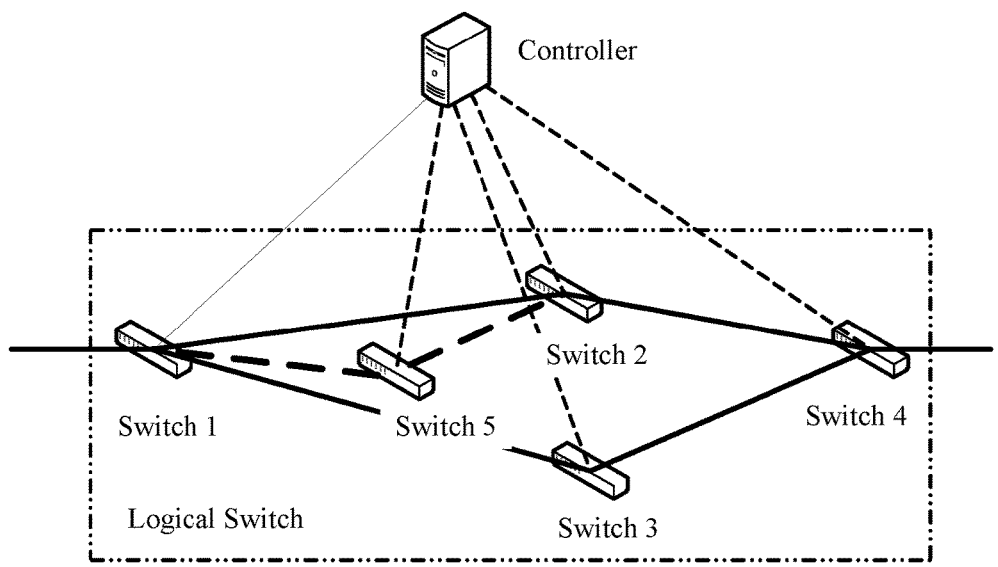
FIG. 4 is a schematic diagram of still another application scenario according to the embodiment shown in FIG. 1.

For example, when a quantity of flow tables supported by the original logical Switch is insufficient for processing new service logic, or when computing resources of the original logical Switch are insufficient because service traffic to be carried increases greatly, an upgrade of a logic function may be implemented by adding a new physical Switch, and a processing capability of the logical Switch may be improved to implement a performance upgrade of the logical Switch. FIG. 4 is a schematic diagram of still another application scenario according to the embodiment shown in FIG. 1. As shown in FIG. 4, the original logical Switch includes a Switch1, a Switch2, a Switch3, and a Switch4, where the Switch1 is a primary Switch, the Switch2 and the Switch3 are first extended Switches, and the Switch4 is a second extended Switch. The original logical Switch can support only n flow tables. When more complex logic needs to be processed, a new Switch5 may be added between the Switch1 and the Switch2 in a stacking manner, and together with the original logical Switch, forms a new logical Switch that can support n+m flow tables, namely, the Switch1 to the Switch5, and replaces the original logical Switch in the network topology to achieve an effect of upgrading functions of the logical Switch. In FIG. 4, a solid line between Switches is a data connection existing before the upgrade, and a dashed line is a data connection added after the upgrade, and connection relationships between the controller and the extended Switches are shown by dashed lines. It can be seen that, the network topology keeps stable before and after the upgrade. This means that an upgrade process is very smooth, and has little impact on network running, and therefore, reliability of the network is also guaranteed. Similarly, when a quantity n of flow tables supported by the original logical Switch, namely, the Switch1 to the Switch4, can meet requirements of complexity of service logic, but a higher processing capability is required with increase of traffic carried by the original logical Switch, the new Switch5 may be added between the Switch1 and the Switch2 in a stacking manner, and the original logical Switch is replaced with the Switch1 to Switch5 in the network topology. Although the logical Switch after the upgrade still supports n flow tables, because a higher computing capability is implemented due to the increase of physical Switches, an effect of upgrading performance of the logical Switch is achieved. It should be noted that, in the application scenario shown in FIG. 4, the original logical Switch, for example, may also include only the Switch1, and the Switch2 is stacked on the Switch1 to form a new logical Switch.

The switch processing method provided by this embodiment is executed by a controller and a logical Switch, where the logical Switch includes at least two physical Switches. The controller allocates each flow table in multiple flow tables of the logical Switch to each physical Switch, and sends mapping information and flow entries, so that each physical Switch obtains the mapping information and flow entries corresponding to the physical Switch. Further, each physical Switch may process a received data packet according to the obtained flow entries and a mapping relationship or according to the flow entries. In the logical Switch for executing the switch processing method provided by this embodiment, new physical Switches may be stacked on a basis of a physical structure of the logical Switch. This helps to maintain stability of an existing network topology, improves a processing capability of the logical Switch, and reduces impact on network running and costs of capacity expansion.

Embodiment 2

Figure 5:
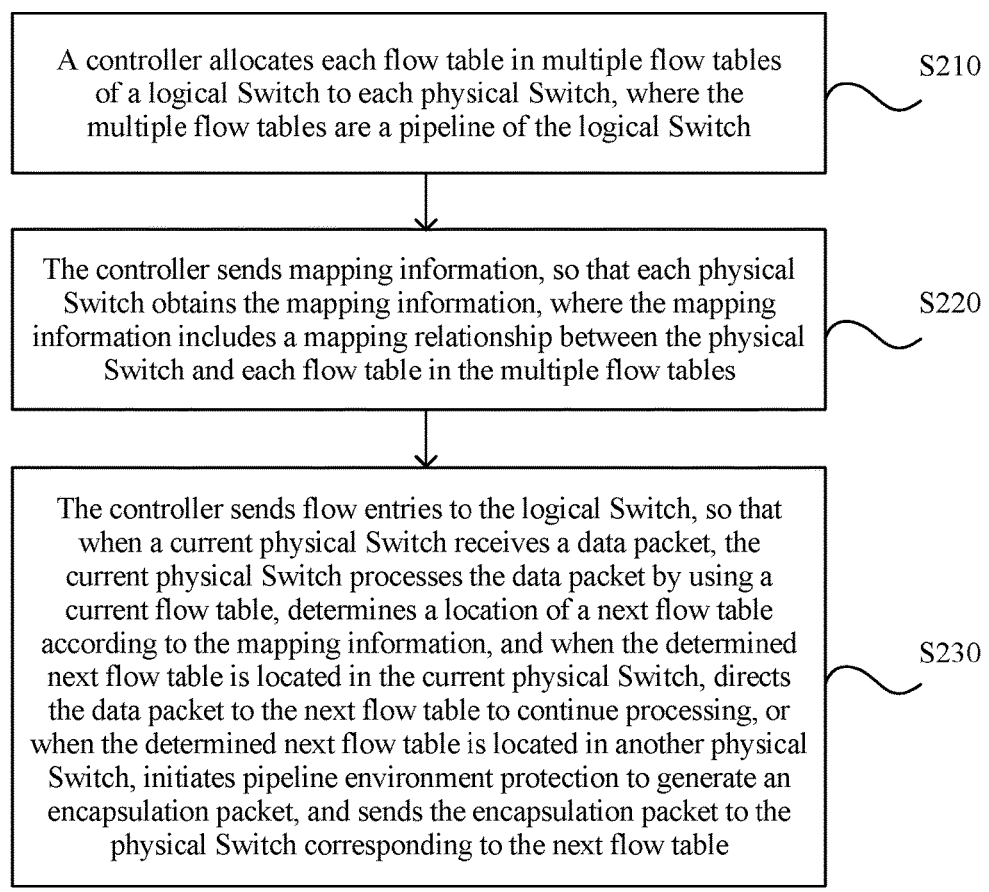
FIG. 5 is a flowchart of a switch processing method according to Embodiment 2 of the present invention.

FIG. 5 is a flowchart of a switch processing method according to Embodiment 2 of the present invention. The switch processing method provided by this embodiment is executed by a controller and a logical Switch, where the logical Switch includes at least two physical Switches. As shown in FIG. 5, the method in this embodiment includes the following steps:

S210. The controller allocates each flow table in multiple flow tables of the logical Switch to each physical Switch, where the multiple flow tables are a pipeline of the logical Switch.

S220. The controller sends mapping information, so that each physical Switch obtains the mapping information, where the mapping information includes a mapping relationship between the physical Switch and each flow table in the multiple flow tables.

Specifically, for implementation manners of steps S210 to step S220, reference may be made to steps S110 to S120 in Embodiment 1.

S230. The controller sends flow entries to the logical Switch, so that when a current physical Switch receives a data packet, the current physical Switch processes the data packet by using a current flow table, determines a location of a next flow table according to the mapping information, and when the determined next flow table is located in the current physical Switch, directs the data packet to the next flow table to continue processing, or when the determined next flow table is located in another physical Switch, initiates pipeline environment protection to generate an encapsulation packet, and sends the encapsulation packet to the physical Switch corresponding to the next flow table.

In this embodiment, when receiving and processing the data packet, the current physical Switch determines, with reference to the received mapping information, the location of the next flow table for processing the data packet. On the one hand, processing may be still performed by using a flow table of the current physical Switch, that is, the current physical Switch may directly direct the data packet to the next flow table of the current physical Switch to continue processing. On the other hand, when the current physical Switch finds that another physical Switch needs to continue to process the data packet, the current physical Switch needs to perform pipeline environment protection on the multiple flow tables. The method provided by this embodiment is pipeline environment protection controlled by a Switch, and decided, initiated, and executed by the Switch. When delivering flow entries, the controller does not need to consider whether each flow table is located in a same physical switch. Specifically, the current physical Switch determines the location of the next flow table. Specifically, when the next flow table is located in another physical Switch, the current physical Switch initiates pipeline environment protection to generate an encapsulation packet, and sends the generated encapsulation packet to the physical Switch corresponding to the next flow table.

Figure 6:
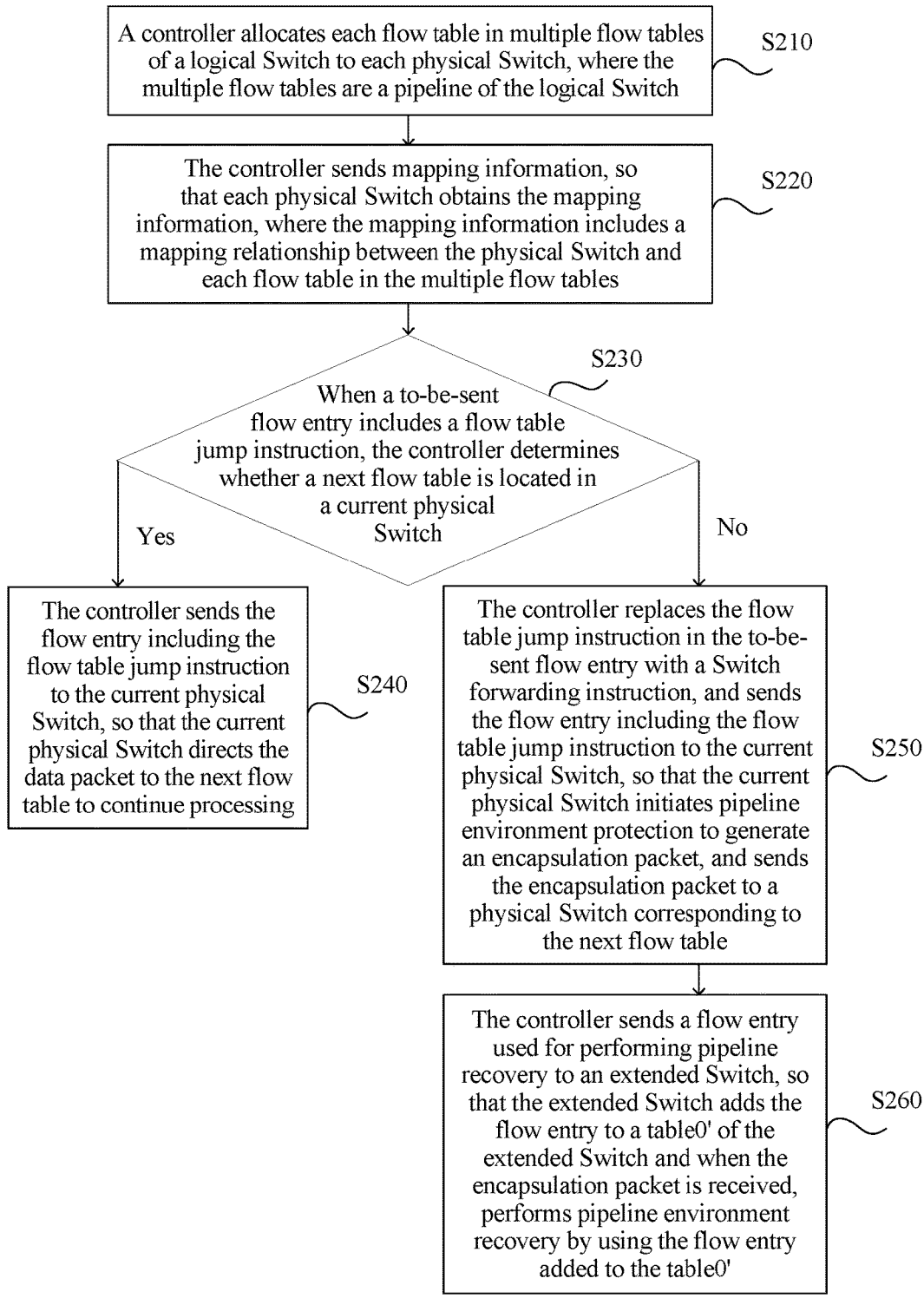
FIG. 6 is a flowchart of another switch processing method according to an embodiment of the present invention.

Optionally, in another possible implementation manner of this embodiment, as shown in FIG. 6, FIG. 6 is a flowchart of another switch processing method according to an embodiment of the present invention. Specifically, pipeline environment protection is controlled by the controller and decided by the controller, and a Switch only needs to directly execute a corresponding instruction. On a basis of the foregoing method shown in FIG. 5, after step S220, the method includes: S230. When a to-be-sent flow entry includes a flow table jump instruction, the controller determines whether a next flow table is located in a current physical Switch, and if yes, performs step S240, or if no, performs step S250.

S240. The controller sends the flow entry including the flow table jump instruction to the current physical Switch, so that the current physical Switch directs the data packet to the next flow table to continue processing.

S250. The controller replaces the flow table jump instruction in the to-be-sent flow entry with a Switch forwarding instruction, and sends the flow entry including the flow table jump instruction to the current physical Switch, so that the current physical Switch initiates pipeline environment protection to generate an encapsulation packet, and sends the encapsulation packet to a physical Switch corresponding to the next flow table.

The controller generally sends a flow entry to a Switch by using a Flow_Mod message. In this embodiment, the flow table jump instruction may be, for example, an instruction of a "Goto_table" type; and the Switch forwarding instruction may be, for example, an instruction of a "forwarding to a subsequent Switch" type. Specifically, when finding that an executable instruction in the to-be-sent flow entry includes "Goto_table", the controller determines the location of the next flow table, and determines whether the next flow table is located in the current physical Switch; if yes, the controller uses the "Goto_table" instruction, that is, the controller directly sends the flow entry including "Goto_table" to the current physical Switch; or if no, the controller uses the "forwarding to a subsequent Switch" instruction, that is, the controller replaces "Goto_table" in the flow entry with "forwarding to a subsequent Switch", and sends the flow entry with the replaced instruction to the current physical Switch, and the current physical Switch initiates pipeline environment protection according to the "forwarding to a subsequent Switch" instruction type in the flow entry.

It should be noted that, because the method provided by this embodiment is executed by at least two physical Switches, when the data packet is processed and directed to the next flow table, for confidentiality of the data packet, pipeline environment protection needs to be initiated when the data packet is forwarded between different physical Switches. This is different from a manner of execution by only a fixed physical Switch in the prior art. Although control manners in the embodiments shown in FIG. 5 and FIG. 6 are different, manners of pipeline environment protection by the current physical Switch are the same. Specifically, the current physical Switch encapsulates the data packet and related information for processing the data packet into the encapsulation packet, where the related information for processing the data packet includes at least a number (Identity, ID for short) of the next flow table, and further optionally includes any quantity of the following information: an ingress port (Ingress port), an action set (Action set) currently corresponding to the data packet, and metadata (Metadata).

Further, after performing pipeline environment protection, the current physical Switch sends the encapsulation packet generated by performing pipeline environment protection to the physical Switch corresponding to the next flow table. Correspondingly, the physical Switch corresponding to the next flow table needs to perform pipeline environment recovery to obtain the data packet. In the method provided by this embodiment, pipeline environment recovery is controlled by the physical Switch corresponding to the next flow table. Specifically, the physical Switch parses the received encapsulation packet and obtains parsed information, where the parsed information includes the data packet and the related information for processing the data packet. The related information for processing the data packet also includes the ID of the next flow table, and further optionally includes any quantity of the following information: an ingress port, an Action set, and Metadata, so that the physical Switch performs pipeline environment recovery according to the parsed information and directs the data packet obtained by parsing to the next flow table to continue processing. The method for directing to the next flow table is the same as that in the foregoing embodiment, and therefore is not further described herein.

Optionally, in another possible implementation manner of this embodiment, pipeline environment recover may be controlled by the controller. The pipeline environment recovery may be performed on a basis of the foregoing embodiment shown in FIG. 5 or FIG. 6, and is illustrated in this embodiment on a basis of FIG. 6. As shown in FIG. 6, after step S250, the method further includes:

S260. The controller sends a flow entry used for performing pipeline recovery to an extended Switch, so that the extended Switch adds the flow entry to a first flow table table0' of the extended Switch and when the encapsulation packet is received, performs pipeline environment recovery by using the flow entry added to the table0'. It should be noted that, generally, the controller sends the flow entries beforehand. In this embodiment, there is no definite sequence between steps S250 and S260. For example, step S250 is shown before step S260 in FIG. 6.

In this embodiment, the extended Switch performs pipeline environment recovery by using the received flow entry that is used for performing pipeline recovery and sent by the controller, where the flow entry used for performing pipeline recovery may include a match part and an executable instruction. The ID of the next flow table in the encapsulation packet is used as a match object of the match part of the flow entry, and the executable instruction may include a flow table recovery instruction and/or a flow table jump instruction. A specific process of pipeline environment recovery is: the extended Switch matches, by using the flow entry in the table0', the encapsulation packet received by the extended Switch, and when the ID of the next flow table matches the flow entry in the table0', executes the flow table recovery instruction and/or the flow table jump instruction in the matched flow entry in sequence according to a match result. For example, the ID of the next flow table for the encapsulation packet received by the extended Switch is equal to a logical flow table 3. Necessarily, a flow entry in the logical flow table 3 can be matched successfully. According to a basic operation manner of the Openflow protocol, after the matching succeeds, the extended Switch executes an executable instruction in the matched flow entry.

The switch processing method provided by this embodiment is executed by a controller and a logical Switch including at least two physical Switches. When a data packet is forwarded between different physical Switches, seamless pipeline processing of the data packet is implemented between physical Switches of the same logical Switch through pipeline environment protection and recovery. The switch processing method provided by this embodiment has a same advantageous effect as that in the foregoing embodiment, and therefore is not further described herein.

Embodiment 3

Figure 7:
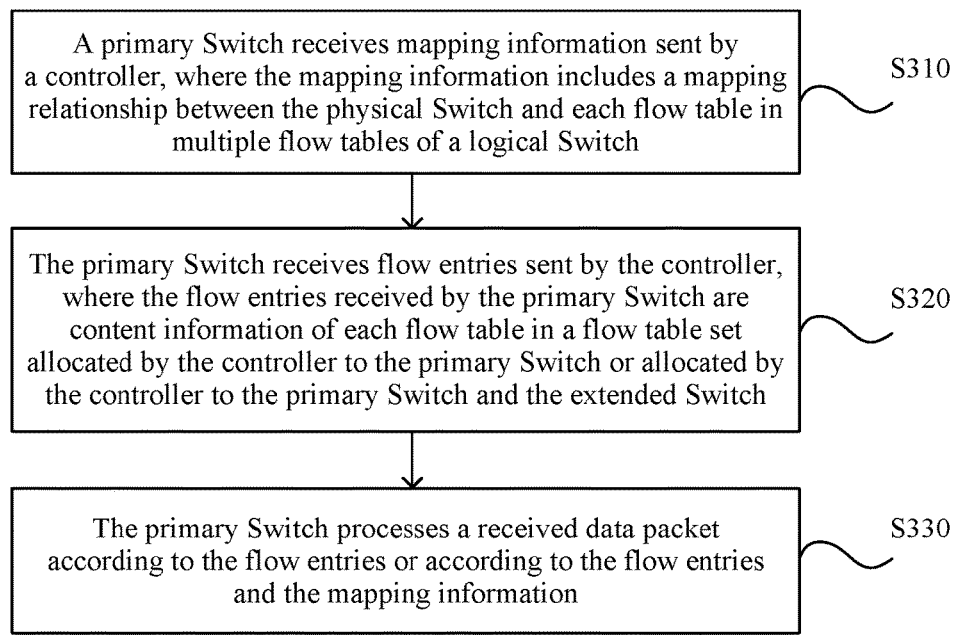
FIG. 7 is a flowchart of a switch processing method according to Embodiment 3 of the present invention.

FIG. 7 is a flowchart of a switch processing method according to Embodiment 3 of the present invention. The switch processing method provided by this embodiment is executed by a controller and a logical Switch. Similar to the foregoing embodiment, the logical Switch includes at least two physical Switches, where the at least two physical Switches include a primary Switch and an extended Switch, and the controller is connected to at least the primary Switch. As shown in FIG. 7, the method in this embodiment includes the following steps:

S310. The primary Switch receives mapping information sent by the controller, where the mapping information includes a mapping relationship between the physical Switch and each flow table in multiple flow tables of the logical Switch.

S320. The primary Switch receives flow entries sent by the controller, where the flow entries received by the primary Switch are content information of each flow table in a flow table set allocated by the controller to the primary Switch or allocated by the controller to the primary Switch and the extended Switch.

In this embodiment, when the controller allocates each flow table in the multiple flow tables to different physical Switches for sharing, a first flow table table0 in the multiple flow tables of the logical Switch is necessarily allocated to the primary Switch. If the extended Switch is connected to only the primary Switch, after receiving the mapping information, the primary Switch may further send the mapping information to the extended Switch connected to the primary Switch. Similarly, after receiving the flow entries sent by the controller, the primary Switch may further send, to the extended Switch connected to the primary Switch, flow entries allocated by the controller. Similar to the foregoing embodiment, the extended Switch in this embodiment may also include a first extended Switch and a second extended Switch. The primary Switch is connected to at least the first extended Switch, and the second extended Switch is connected to at least the first extended Switch. A manner of distributing the mapping information and flow entries is the same as that in the foregoing embodiment, and is related to a connection relationship between each physical Switch and the controller. For the connection relationship between each physical Switch and the controller in this embodiment, reference may be made to FIG. 2 and FIG. 3, and therefore, details are not described herein.

S330. The primary Switch processes a received data packet according to the flow entries or according to the flow entries and the mapping information.

In this embodiment, when the primary Switch obtains the mapping information sent by the controller, the primary Switch knows the flow table allocated to the primary Switch, and also knows flow tables allocated to other physical Switches, and fills the received flow entries in the corresponding flow table. Content of the flow entries is similar to that in the foregoing embodiment. Further, the primary Switch processes the data packet according to the received flow entries or according to the flow entries and the mapping information. Because the primary Switch includes the table0 in the multiple flow tables of the logical Switch, processing of the data packet starts from the table0. It should be noted that, in this embodiment, the data packet received by the primary Switch may be generally sent by an external node (Host), for example, a computer that may perform mutual access with the primary Switch.

The switch processing method provided by this embodiment is executed by a controller and a logical Switch. Physical Switches forming the logical Switch include at least a primary Switch and an extended Switch. The primary Switch processes a received data packet by using mapping information and flow entries sent by the controller, where the flow entries received by the primary Switch may be flow entries allocated by the controller to the primary Switch, or may be flow entries allocated by the controller to the primary Switch and the extended Switch. In this distribution manner, the primary Switch may further send the mapping information and flow entries corresponding to the extended Switch to the extended Switch. Therefore, finally, each physical Switch obtains the mapping information and flow entries corresponding to the physical Switch that are sent by the controller, and further, the extended Switch may also process the received data packet according to the flow entries and mapping information that are obtained or according to the flow entries. In the logical Switch for executing the switch processing method provided by this embodiment, new physical Switches may be stacked on a basis of a physical structure of the logical Switch. This helps to maintain stability of an existing network topology, improves a processing capability of the logical Switch, and reduces impact on network running and costs of capacity expansion.

Embodiment 4

Figure 8:
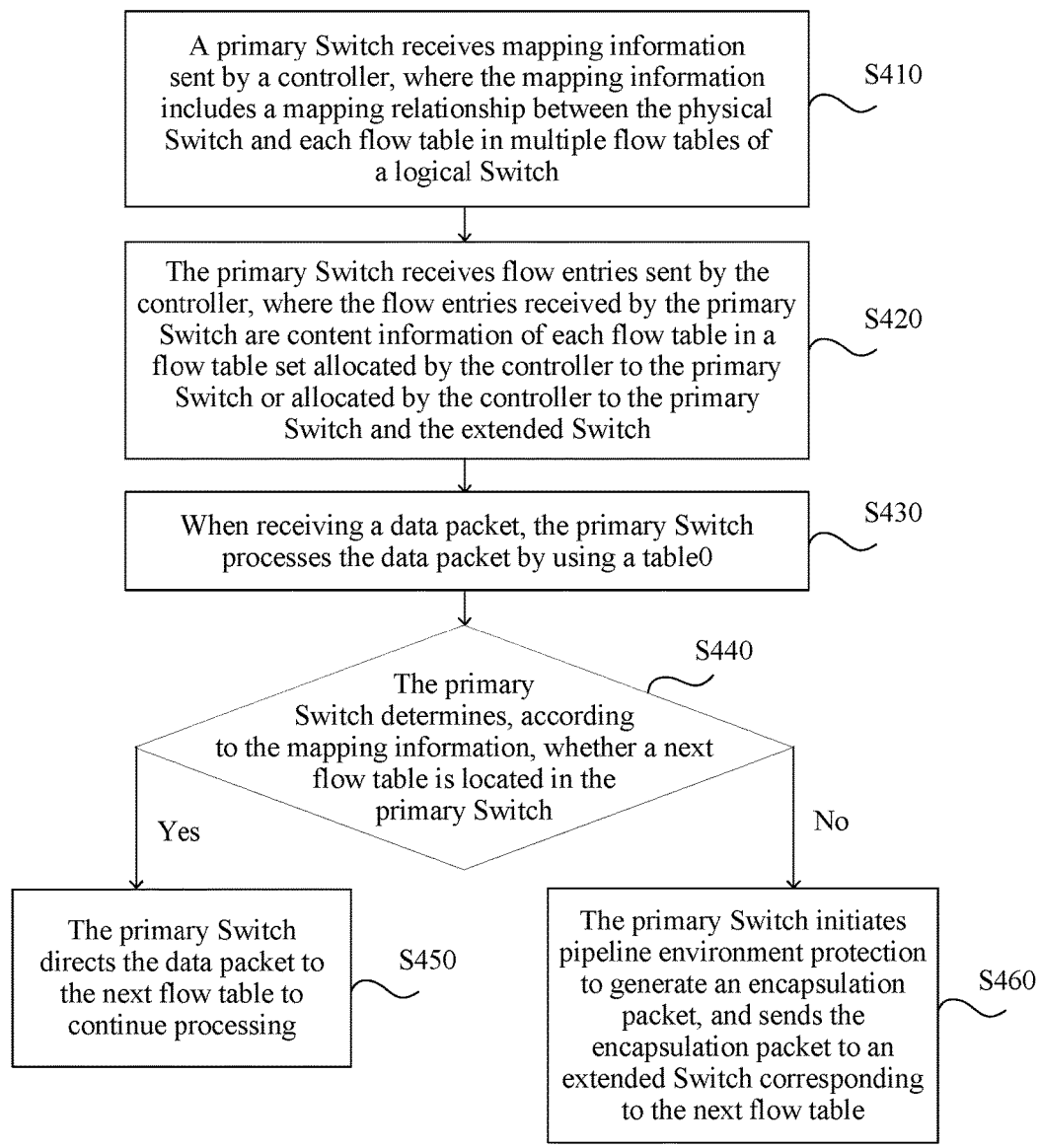
FIG. 8 is a flowchart of a switch processing method according to Embodiment 4 of the present invention.

FIG. 8 is a flowchart of a switch processing method according to Embodiment 4 of the present invention. The switch processing method provided by this embodiment is executed by a controller and a logical Switch. Similar to the foregoing embodiment, the logical Switch includes at least a primary Switch and an extended Switch. As shown in FIG. 8, the method in this embodiment includes the following steps:

S410. The primary Switch receives mapping information sent by the controller, where the mapping information includes a mapping relationship between the physical Switch and each flow table in multiple flow tables of the logical Switch.

S420. The primary Switch receives flow entries sent by the controller, where the flow entries received by the primary Switch are content information of each flow table in a flow table set allocated by the controller to the primary Switch or allocated by the controller to the primary Switch and the extended Switch.

Specifically, for implementation manners of steps S410 to step S420, reference may be made to steps S310 to S320 in Embodiment 3.

S430. When receiving a data packet, the primary Switch processes the data packet by using a table0. As described in the foregoing embodiment, because the primary Switch includes the first flow table table0 in the multiple flow tables of the logical Switch, processing of the data packet by the primary Switch starts from the table0.

S440. The primary Switch determines, according to the mapping information, whether a next flow table is located in the primary Switch, and if yes, performs step S450, or if no, performs step S460.

S450. The primary Switch directs the data packet to the next flow table to continue processing.

S460. The primary Switch initiates pipeline environment protection to generate an encapsulation packet, and sends the encapsulation packet to an extended Switch corresponding to the next flow table.

In this embodiment, when receiving and processing the data packet, the primary Switch determines, with reference to the received mapping information, the location of the next flow table for processing the data packet. On the one hand, when the next flow table is located in the primary Switch, processing may be still performed by using a flow table of the primary Switch, that is, the primary Switch may directly direct the data packet to the next flow table of the primary Switch to continue processing. On the other hand, when the primary Switch finds that the extended Switch needs to continue to process the data packet, that is, the primary Switch determines that the next flow table is located in the extended Switch, the primary Switch needs to perform pipeline environment protection on the multiple flow tables to generate an encapsulation packet, and sends the generated encapsulation packet to the physical Switch corresponding to the next flow table. The method provided by this embodiment is pipeline environment protection controlled by the primary Switch, and is decided, initiated, and executed by the primary Switch. When delivering flow entries, the controller does not need to consider whether each flow table is located in a same physical switch.

Optionally, in another possible implementation manner of this embodiment, pipeline environment protection may be controlled by the controller and decided by the controller, and the primary Switch only needs to directly execute a corresponding instruction. On a basis of the foregoing embodiment shown in FIG. 8, step S420 is replaced as follows: the primary Switch receives a flow entry that includes a flow table jump instruction or a Switch forwarding instruction and is sent by the controller, where the flow table jump instruction or the Switch forwarding instruction in the flow entry is determined by the controller according to whether a next flow table in the flow entry is located in the primary Switch, and if yes, the flow entry includes the flow table jump instruction, or if no, the flow entry includes the Switch forwarding instruction. Correspondingly, step S430 is replaced as follows: the primary Switch receives a data packet, and when the flow entry matching the data packet includes the flow table jump instruction, directs the data packet to the next flow table to continue processing; or the primary Switch receives a data packet, and when the flow entry matching the data packet includes the Switch forwarding instruction, initiates pipeline environment protection to generate an encapsulation packet, and sends the encapsulation packet to an extended Switch corresponding to the next flow table. In this embodiment, the manner of sending the flow entry by the controller, and determining the location of the next flow table and the subsequent processing manner when the controller adds, for example, an instruction of a "Goto_table" type, to the flow entry, are similar to those in the foregoing embodiment, and therefore are not further described herein.

It should be noted that, because the method provided by this embodiment is executed by the logical Switch including the primary Switch and the extended Switch, when the primary Switch forwards the processing data packet to the extended Switch, for confidentiality of the data packet, the primary Switch needs to initiate pipeline environment protection before forwarding the data packet to the extended Switch. This is different from a manner of execution by a fixed physical Switch in the prior art. In specific implementation, the primary Switch encapsulates the data packet and related information for processing the data packet into the encapsulation packet, where the related information for processing the data packet includes at least an ID of the next flow table, and further optionally includes any quantity of the following information: an Ingress port, an Action set, and Metadata.

Further, after performing pipeline environment protection, the primary Switch sends the encapsulation packet generated by performing pipeline environment protection to the extended Switch corresponding to the next flow table. Correspondingly, the extended Switch needs to perform pipeline environment recovery to obtain the data packet. In the method provided by this embodiment, pipeline environment recovery is controlled by the extended Switch. Specifically, the extended Switch parses the received encapsulation packet and obtains parsed information, where the parsed information includes the data packet and the related information for processing the data packet. The related information for processing the data packet also includes the ID of the next flow table, and further optionally includes any quantity of the following information: an ingress port, an Action set, and Metadata, so that the extended Switch performs pipeline environment recovery according to the parsed information and directs the data packet obtained by parsing to the next flow table to continue processing. The method for directing the data packet to the next flow table is the same as that in the foregoing embodiment, and therefore is not further described herein. Similarly, pipeline environment recovery may be further implemented under control of the controller. A specific implementation manner is the same as that in the foregoing embodiment. Because this embodiment is an implementation manner in which the primary Switch is an execution body, and processing by the primary Switch does not involve pipeline environment recovery, details are not described herein.

The switch processing method provided by this embodiment is executed by a controller and a logical Switch including a primary Switch and an extended Switch. When the primary Switch forwards a data packet to the extended Switch, seamless pipeline processing of the data packet is implemented between physical Switches of the same logical Switch through pipeline environment protection by the primary Switch and pipeline environment recovery by the extended Switch. The switch processing method provided by this embodiment has a same advantageous effect as that in the foregoing embodiment, and therefore is not further described herein.

Embodiment 5

Figure 9:
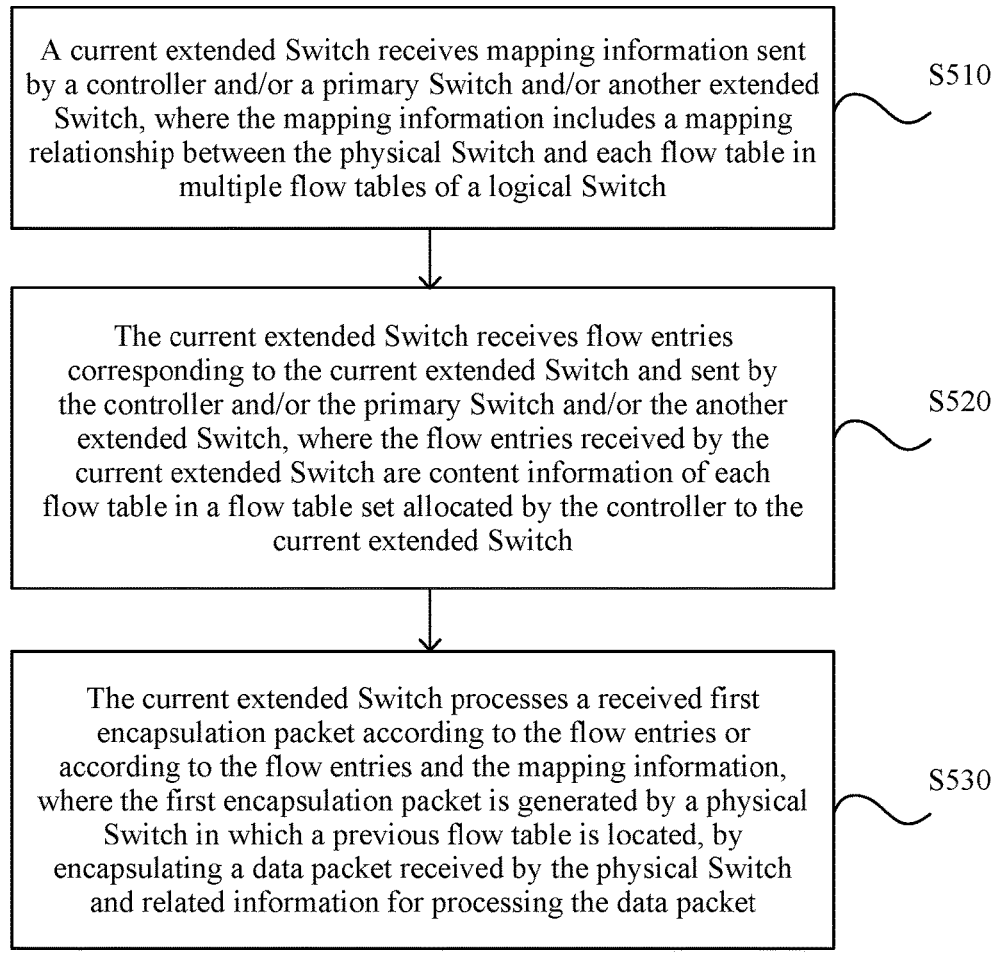
FIG. 9 is a flowchart of a switch processing method according to Embodiment 5 of the present invention.

FIG. 9 is a flowchart of a switch processing method according to Embodiment 5 of the present invention. The switch processing method provided by this embodiment is executed by a controller and a logical Switch. Similarly, the logical Switch includes multiple physical Switches, the multiple physical Switches include a primary Switch and an extended Switch, and the extended Switch includes a first extended Switch and a second extended Switch, where the controller is connected to at least the primary Switch, the primary Switch is connected to at least the first extended Switch, and the second extended Switch is connected to at least the first extended Switch. As shown in FIG. 9, the method in this embodiment includes the following steps:

S510. A current extended Switch receives mapping information sent by the controller and/or the primary Switch and/or another extended Switch, where the mapping information includes a mapping relationship between the physical Switch and each flow table in multiple flow tables of the logical Switch.

S520. The current extended Switch receives flow entries corresponding to the current extended Switch and sent by the controller and/or the primary Switch and/or the another extended Switch, where the flow entries received by the current extended Switch are content information of each flow table in a flow table set allocated by the controller to the current extended Switch.

This embodiment may be executed by the first extended Switch or the second extended Switch. A manner in which the extended Switch receives the mapping information and flow entries sent by the controller is similar to that in the foregoing embodiment, that is, the mapping information and/or flow entries received by the current extended Switch may be directly sent by the controller, or may be forwarded by the primary Switch, or may be forwarded by the another extended Switch, or a combination of the foregoing multiple manners may be used. It should be noted that, when the controller allocates each flow table in the multiple flow tables to different physical Switches for sharing, a first flow table table0 in the multiple flow tables of the logical Switch is necessarily allocated to the primary Switch. Therefore, in the mapping information received by the extended Switch, the table0 in the multiple flow tables of the logical Switch corresponds to the primary Switch. In this embodiment, a manner of distributing the mapping information and flow entries is the same as that in the foregoing embodiment, and is related to a connection relationship between each physical Switch and the controller. For the connection relationship between each physical Switch and the controller in this embodiment, reference may be made to FIG. 3, and therefore, details are not described herein.

S530. The current extended Switch processes a received first encapsulation packet according to the flow entries or according to the flow entries and the mapping information, where the first encapsulation packet is generated by a physical Switch in which a previous flow table is located, by encapsulating a data packet received by the physical Switch and related information for processing the data packet.

Figure 10:
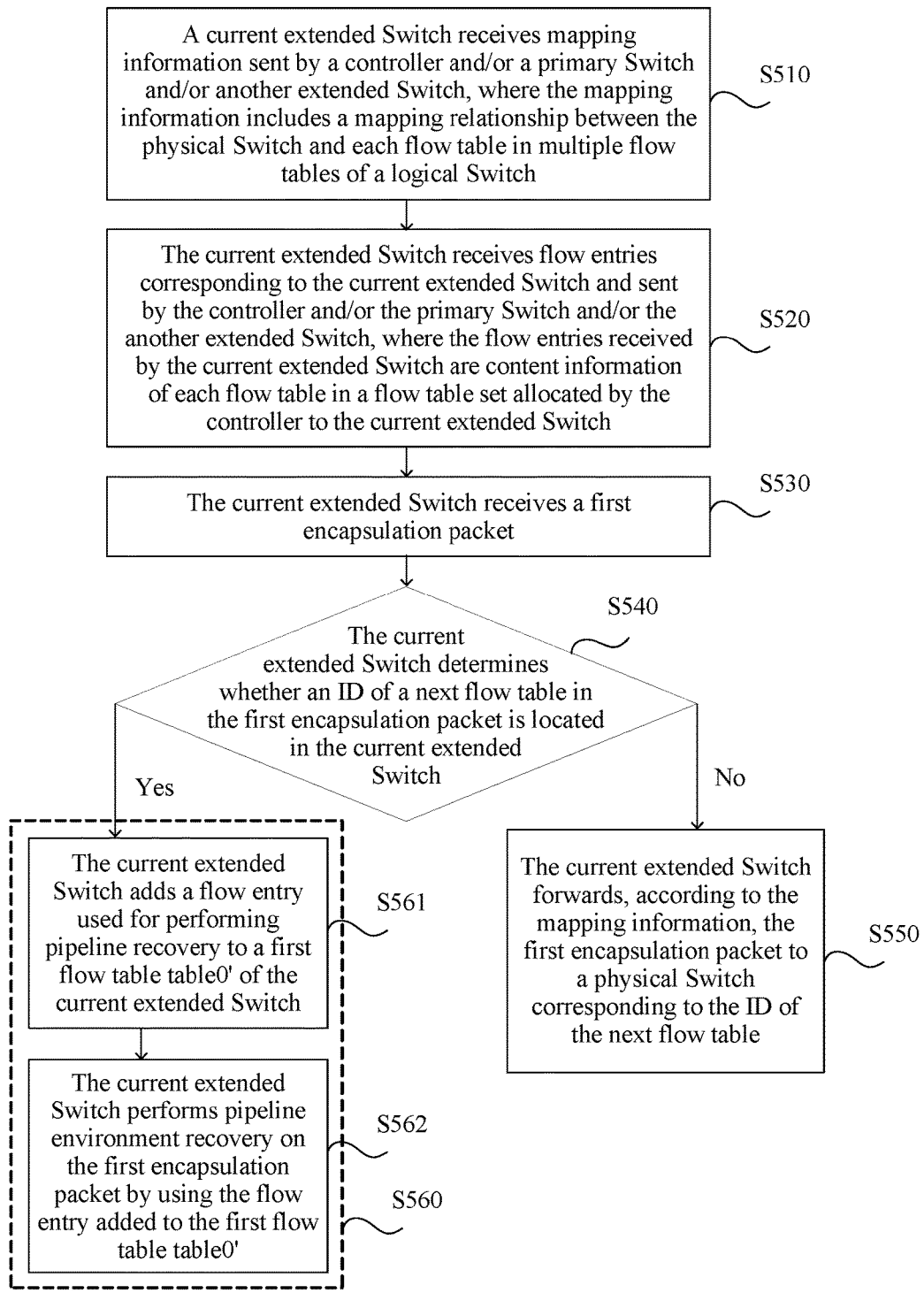
FIG. 10 is a flowchart of still another switch processing method according to an embodiment of the present invention.

In this embodiment, after obtaining the mapping information and flow entries sent by the controller, the current extended Switch processes the received first encapsulation packet. Because the first encapsulation packet received by the current extended Switch is generated after the physical Switch in which the previous flow table is located performs pipeline environment protection, a processing manner after the current extended Switch receives the first encapsulation packet generally includes directly forwarding the packet to a physical Switch corresponding to an ID of a next flow table in the encapsulation packet, or performing pipeline environment recovery on the first encapsulation packet to obtain the data packet. This is different from the manner of processing a data packet by the primary Switch in the embodiments shown in FIG. 7 and FIG. 8. A specific implementation manner of this embodiment is shown in FIG. 10. FIG. 10 is a flowchart of still another switch processing method according to an embodiment of the present invention. On a basis of the embodiment shown in FIG. 9, after step S520, the method includes:

S530. The current extended Switch receives a first encapsulation packet.

S540. The current extended Switch determines whether an ID of a next flow table in the first encapsulation packet is located in the current extended Switch, and if no, performs step S550, or if yes, performs step S560.

S550. The current extended Switch forwards, according to the mapping information, the first encapsulation packet to a physical Switch corresponding to the ID of the next flow table.

S560. The current extended Switch performs pipeline environment recovery on the first encapsulation packet to obtain a data packet.

In this embodiment, when receiving and processing the first encapsulation packet, the current extended Switch determines, according to the ID of the next flow table in the first encapsulation packet, a manner of processing the first encapsulation packet. When the current extended Switch performs pipeline environment recovery, pipeline environment recovery may be controlled by the current extended Switch, that is, step S560 includes: the current extended Switch parses the received first encapsulation packet to obtain parsed information, where the parsed information includes the data packet and related information for processing the data packet, where the related information for processing the data packet includes at least the ID of the next flow table, and further optionally includes any quantity of the following information: an Ingress port, an Action set, and Metadata. Further, the current extended Switch performs pipeline environment recovery according to the parsed information, and directs the data packet to the next flow table to continue processing. The method for directing the data packet to the next flow table is the same as that in the foregoing embodiment, and is not further described herein.

Optionally, in another possible implementation manner of this embodiment, pipeline environment recovery may also be controlled by the controller and decided by the controller, and a Switch only needs to directly execute a corresponding instruction. In specific implementation, the flow entries received by the current extended Switch include a flow entry used for performing pipeline recovery and sent by the controller. Correspondingly, on a basis of the foregoing method shown in FIG. 10, step S560 includes: S561. The current extended Switch adds a flow entry used for performing pipeline recovery to a first flow table table0' of the current extended Switch.

S562. The current extended Switch performs pipeline environment recovery on the first encapsulation packet by using the flow entry added to the table0'.

In this embodiment, the first encapsulation packet includes the ID of the next flow table, and the flow entry used for performing pipeline recovery includes a match part and an executable instruction, where the executable instruction includes a flow table recovery instruction and/or a flow table jump instruction; and step S562 includes: the current extended Switch matches the first encapsulation packet by using the flow entry in the table0'; and when the flow entry in the table0' is matched successfully, executes the flow table recovery instruction and/or the flow table jump instruction in the matched flow entry in sequence according to a match result.

Further, after performing pipeline environment recovery, the current extended Switch may continue to process the obtained data packet. A manner of processing the data packet is similar to that in the foregoing embodiment. Likewise, with reference to the mapping information, a location of a next flow table for processing the data packet may be determined, and a processing manner is determined. Specifically, on a basis of the foregoing embodiment shown in FIG. 10, the method further includes: when the current extended Switch obtains the data packet, the current extended Switch processes the data packet by using the current flow table, and determines a location of a next flow table. On the one hand, when the next flow table is located in the current extended Switch, processing is still performed by using a flow table of the current extended Switch, that is, the current extended Switch may directly direct the data packet to the next flow table to continue processing. On the other hand, when the current extended Switch finds that another extended Switch needs to continue to process the data packet, the current extended Switch needs to perform pipeline environment protection on the multiple flow tables to generate a second encapsulation packet, and sends the generated second encapsulation packet to the extended Switch corresponding to the next flow table. The method provided by this embodiment is pipeline environment protection controlled by the current extended Switch, and is decided, initiated, and executed by the current extended Switch. When delivering flow entries, the controller does not need to consider whether each flow table is located in a same physical switch.

Optionally, similar to the foregoing embodiment, in another possible implementation manner of this embodiment, pipeline environment protection may be controlled by the controller and decided by the controller, and the current extended Switch only needs to directly execute a corresponding instruction. On a basis of the foregoing method shown in FIG. 10, the method further includes: the current extended Switch receives a flow entry that includes a flow table jump instruction or a Switch forwarding instruction and is sent by the controller, where the flow table jump instruction or the Switch forwarding instruction in the flow entry is determined by the controller according to whether the next flow table in the flow entry is located in the current extended Switch, and if yes, the flow entry includes the flow table jump instruction, or if no, the flow entry includes the Switch forwarding instruction. Correspondingly, after step S560, the method further includes: the current extended Switch obtains the data packet in the first encapsulation packet, and when the flow entry matching the data packet includes the flow table jump instruction, directs the data packet to the next flow table to continue processing; or the current extended Switch obtains the data packet in the first encapsulation packet, and when the flow entry matching the data packet includes the Switch forwarding instruction, initiates pipeline environment protection to generate a second encapsulation packet, and sends the second encapsulation packet to an extended Switch corresponding to the next flow table. In this embodiment, the manner of sending the flow entry by the controller, and determining the location of the next flow table and the subsequent processing manner when the controller adds, for example, an instruction of a "Goto_table" type, to the flow entry, are similar to those in the foregoing embodiment, and therefore are not further described herein.

It should be noted that, because the method provided by this embodiment is executed by the controller and the logical Switch including the current extended Switch, when the current extended Switch receives the encapsulation packet or forwards the obtained data packet to another extended Switch, the current extended Switch needs to initiate pipeline environment protection and recovery to implement seamless pipeline processing of the data packet between physical Switches of the same logical Switch. This is different from a manner of execution by only a fixed physical Switch in the prior art. The switch processing method provided by this embodiment has a same advantageous effect as that in the foregoing embodiment, and therefore is not further described herein.

Embodiment 6

Figure 11A:
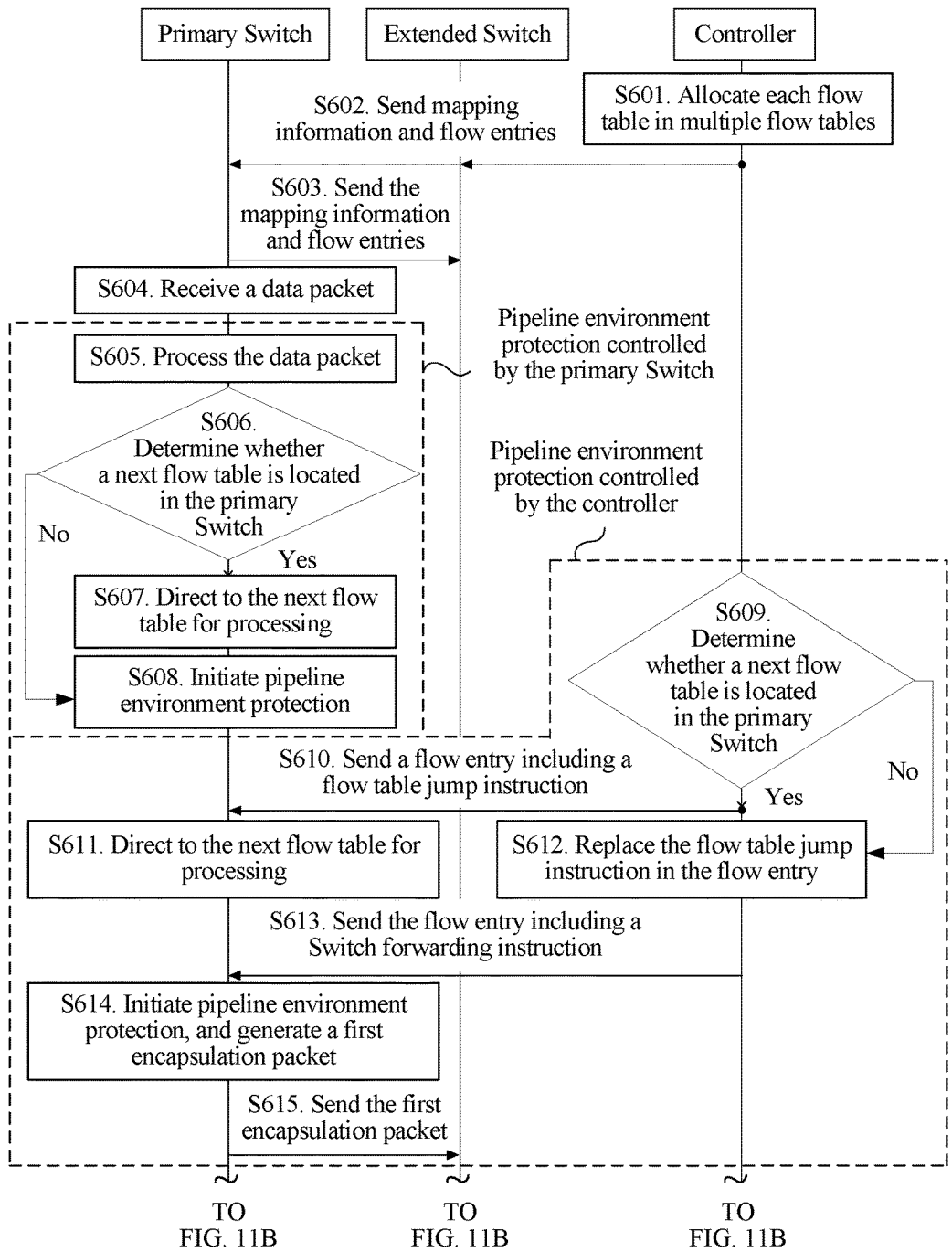
FIG. 11A, FIG. 11B, and FIG. 11C are a flowchart of a switch processing method according to Embodiment 6 of the present invention.
Figure 11B:
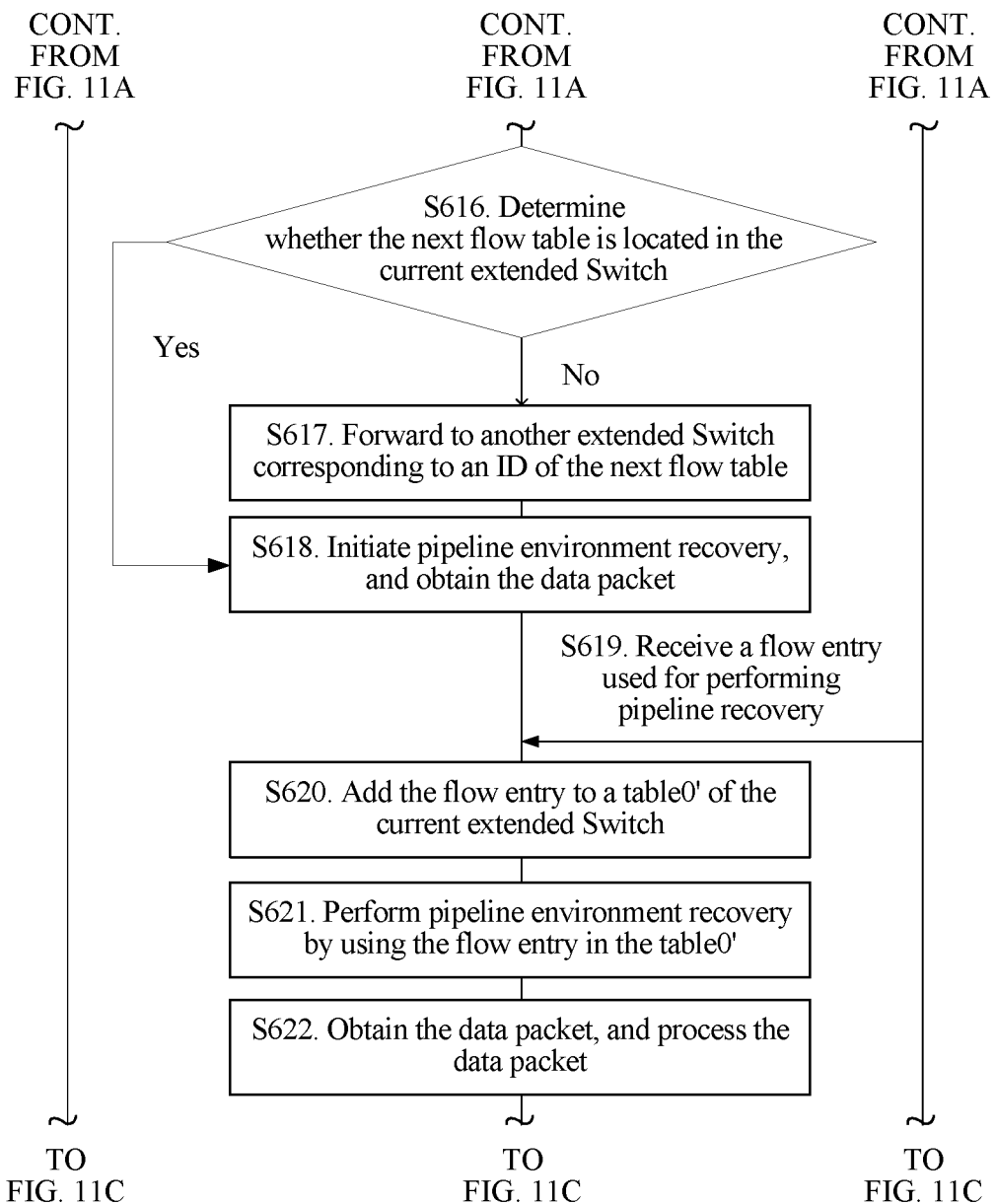
Figure 11C:
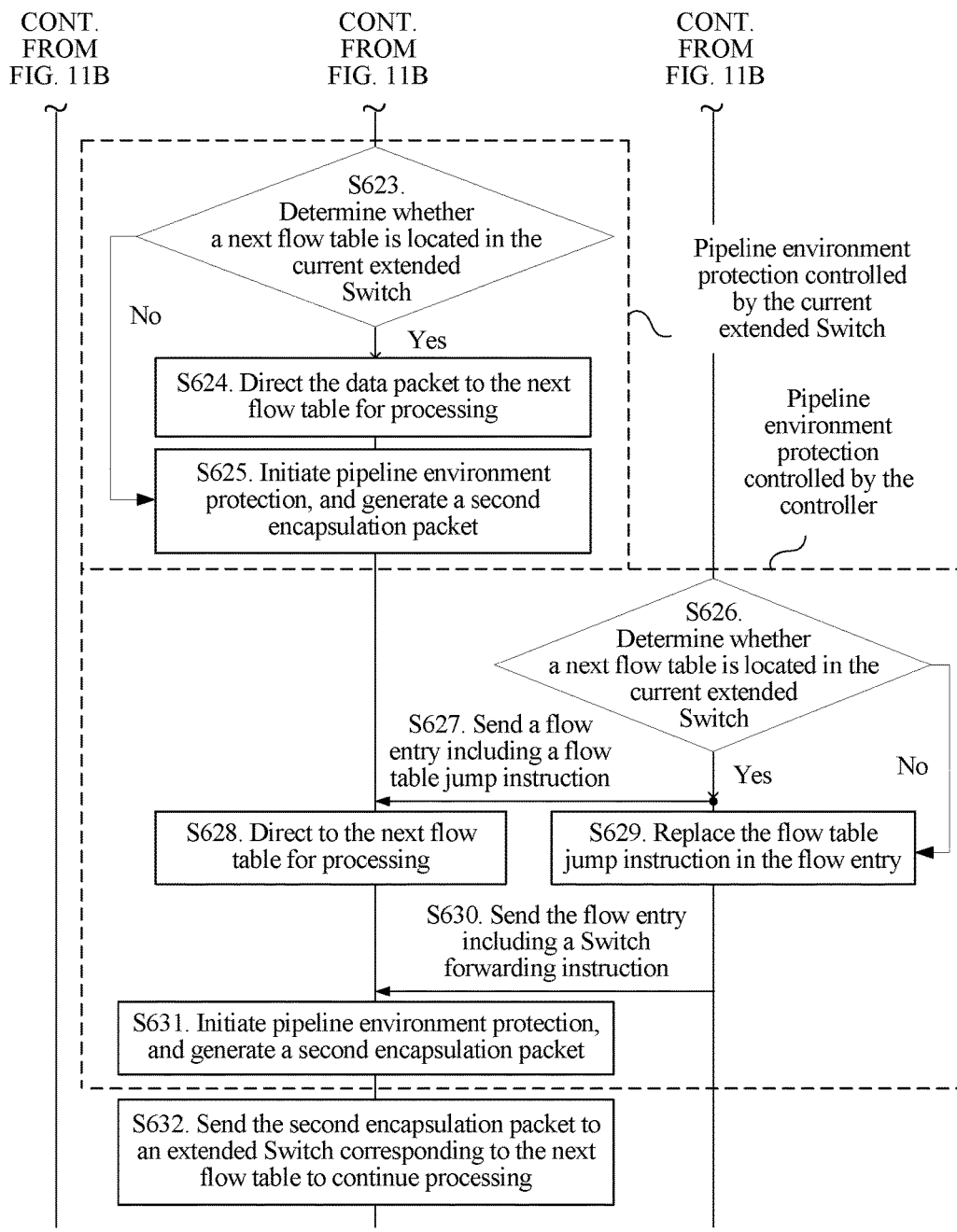

FIG. 11A, FIG. 11B, and FIG. 11C are a flowchart of a switch processing method according to Embodiment 6 of the present invention. The switch processing method provided by this embodiment is executed by a controller and a logical Switch. Similar to the foregoing embodiment, the logical Switch includes at least multiple physical Switches, and the multiple physical Switches include a primary Switch and an extended Switch. There may be multiple such extended Switches, for example, including a first extended Switch and a second extended Switch. The controller is connected to at least the primary Switch, the primary Switch is connected to at least the first extended Switch, and the second extended Switch is connected to at least the first extended Switch. As shown in FIG. 11A, FIG. 11B, and FIG. 11C, the method in this embodiment includes the following steps:

S601. The controller allocates each flow table in multiple flow tables of the logical Switch to each physical Switch, where the multiple flow tables are a pipeline of the logical Switch.

S602. The controller sends mapping information and flow entries, where the mapping information includes a mapping relationship between each physical Switch and each flow table in the multiple flow tables, and the flow entries are content information of each flow table in a flow table set allocated by the controller to each physical Switch.

In this embodiment, flow entries received by the primary Switch may include only flow entries corresponding to the primary Switch, and may further include flow entries corresponding to each physical Switch. In this case, the method provided by this embodiment further includes:

S603. The primary Switch forwards, to an extended Switch connected to the primary Switch, the mapping information and flow entries allocated by the controller. It should be noted that, this step is optional, and is related to a manner of connection between each physical Switch and the controller.

In this embodiment, the manner of receiving the mapping information and flow entries by a current extended Switch corresponds to the foregoing sending manner. The mapping information and flow entries received by the current extended Switch may be directly sent by the controller, or may be forwarded by the primary Switch, or may be forwarded by another extended Switch, or a combination of the foregoing multiple manners may be used.

It should be noted that, when the controller allocates each flow table in the multiple flow tables to different physical Switches for sharing, a first flow table table0 in the multiple flow tables of the logical Switch is necessarily allocated to the primary Switch. In this embodiment, a manner of distributing the mapping information and flow entries is the same as that in the foregoing embodiment, and is related to a connection relationship between each physical Switch and the controller. For the connection relationship between each physical Switch and the controller in this embodiment, reference may be made to FIG. 3, and therefore, details are not described herein. It should be further noted that, sending the mapping information and flow entries by the controller and receiving the mapping information and flow entries by each physical Switch are generally performed separately. In the step of the embodiment shown in FIG. 11A, FIG. 11B, and FIG. 11C, only execution bodies that send and receive the mapping information and flow entries are illustrated. This does not mean that the mapping information and flow entries are sent or received simultaneously.

In this embodiment, a processing manner of the primary Switch after a data packet is received may be specifically:

S604. The primary Switch receives a data packet, where the data packet received by the primary Switch may be generally sent by a Host, for example, a computer that may perform mutual access with the primary Switch.

S605. The primary Switch processes the data packet by using a table0.

S606. The primary Switch determines, according to the mapping information, whether a next flow table is located in the primary Switch, and if yes, performs step S607, or if no, performs step S608.

S607. The primary Switch directs the data packet to the next flow table to continue processing.

S608. The primary Switch initiates pipeline environment protection to generate a first encapsulation packet, and sends the first encapsulation packet to an extended Switch corresponding to the next flow table.

The manner described in steps S605 to S608 is pipeline environment protection controlled by the primary Switch.

In another possible implementation manner of this embodiment, pipeline environment protection is controlled by the controller. Specifically, a flow entry received by the primary Switch includes a flow table jump instruction or a Switch forwarding instruction. Correspondingly, the foregoing steps S605 to S608 are replaced as follows:

S609. When a flow entry to be sent to the primary Switch includes a flow table jump instruction, the controller determines whether a next flow table is located in the primary Switch, and if yes, performs step S610, or if no, performs step S612.

S610. The controller sends the flow entry including the flow table jump instruction to the primary Switch.

S611. Correspondingly, the primary Switch directs the data packet to the next flow table to continue processing.

S612. The controller replaces the flow table jump instruction in the to-be-sent flow entry with a Switch forwarding instruction.

S613. Send the flow entry including the Switch forwarding instruction to the primary Switch.

S614. Correspondingly, the primary Switch initiates pipeline environment protection to generate a first encapsulation packet.

S615. The primary Switch sends the first encapsulation packet to an extended Switch corresponding to the next flow table.

In this embodiment, after the primary Switch sends the first encapsulation packet generated after performing pipeline environment protection to the current extended Switch, the current extended Switch processes the first encapsulation packet. Specifically, the processing includes:

S616. The current extended Switch determines whether an ID of the next flow table in the first encapsulation packet is located in the current extended Switch, and if no, performs step S617, or if yes, performs step S618.

S617. The current extended Switch forwards, according to the mapping information, the first encapsulation packet to another extended Switch corresponding to the ID of the next flow table.

S618. The current extended Switch performs pipeline environment recovery on the first encapsulation packet to obtain the data packet.

In this embodiment, when receiving and processing the first encapsulation packet, the current extended Switch determines, according to the ID of the next flow table in the first encapsulation packet, a manner of processing the first encapsulation packet. When the current extended Switch performs pipeline environment recovery, pipeline environment recovery may be controlled by the current extended Switch, that is, step S618 is replaced as follows: the current extended Switch parses the received first encapsulation packet to obtain parsed information, where the parsed information includes the data packet and related information for processing the data packet, where the related information for processing the data packet includes at least the ID of the next flow table, and further optionally includes any quantity of the following information: an Ingress port, an Action set, and Metadata.

Optionally, in another possible implementation manner of this embodiment, pipeline environment recovery may also be controlled by the controller. In specific implementation, the method further includes: S619. The current extended Switch receives a flow entry used for performing pipeline recovery and sent by the controller. S620. The current extended Switch adds the flow entry used for performing pipeline recovery to a first flow table table0' of the current extended Switch. S621. The current extended Switch performs pipeline environment recovery on the first encapsulation packet by using the flow entry added to the table0'.

In this embodiment, the first encapsulation packet includes the ID of the next flow table, and the flow entry used for performing pipeline recovery includes a match part and an executable instruction, where the executable instruction includes a flow table recovery instruction and/or a flow table jump instruction; and step S621 includes: the current extended Switch matches the first encapsulation packet by using the flow entry in the table0'; and when the flow entry in the table0' is matched successfully, executes the flow table recovery instruction and/or the flow table jump instruction in the matched flow entry in sequence according to a match result.

Further, after performing pipeline environment recovery, the current extended Switch may continue to process the obtained data packet. A manner of processing the data packet is similar to that in the foregoing embodiment. Likewise, with reference to the mapping information, a location of a next flow table for processing the data packet may be determined, and a processing manner is determined. Specifically, the method provided by this embodiment further includes:

S622. The current extended Switch obtains the data packet, and processes the data packet by using a current flow table.

S623. The current extended Switch determines, according to the mapping information, whether a next flow table for processing the data packet is located in the current extended Switch, and if yes, performs step S624, or if no, performs step S625.

S624. The current extended Switch directs the data packet to the next flow table to continue processing.

S625. The current extended Switch initiates pipeline environment protection to generate a second encapsulation packet.

The manner described in steps S623 to S625 is a manner of pipeline environment protection controlled by the current extended Switch.

Optionally, similar to the foregoing embodiment, in another possible implementation manner of this embodiment, pipeline environment protection may be controlled by the controller, and a flow entry received by the current extended Switch includes a flow table jump instruction or a Switch forwarding instruction. In specific implementation, the foregoing steps S623 to S625 are replaced as follows:

S626. When a to-be-sent flow entry includes a flow table jump instruction, the controller determines whether a next flow table is located in the current physical Switch, and if yes, performs step S627, or if no, performs step S629.

S627. The controller sends the flow entry including the flow table jump instruction to the current extended Switch.

S628. Correspondingly, the current extended Switch directs the data packet to the next flow table to continue processing.

S629. The controller replaces the flow table jump instruction in the to-be-sent flow entry with a Switch forwarding instruction.

S630. The controller sends the flow entry including the Switch forwarding instruction to the current extended Switch.

Correspondingly, the method provided by this embodiment further includes: S631. The current extended Switch initiates pipeline environment protection to generate a second encapsulation packet.

S632. The current extended Switch sends the second encapsulation packet to an extended Switch corresponding to the next flow table to continue processing.

It should be noted that, because the method provided by this embodiment is executed by the controller and the logical Switch including the primary Switch and the extended Switch, when the data packet is processed and directed to the next flow table, for confidentiality of the data packet, the primary Switch or the current extended Switch needs to initiate pipeline environment protection before forwarding the data packet to another physical Switch. This is different from a manner of execution by a fixed physical Switch in the prior art. After receiving the encapsulation packet that undergoes pipeline environment protection, the current extended Switch needs to initiate pipeline environment recovery to obtain the data packet. Similarly, the current extended Switch also needs to initiate pipeline environment protection when forwarding the processed data packet to another extended Switch. The switch processing method provided by this embodiment includes the method described in any one of the foregoing embodiments. Both a specific implementation manner and an advantageous effect thereof are the same as those in the foregoing embodiments, and therefore are not further described herein.

Embodiment 7

Figure 12:
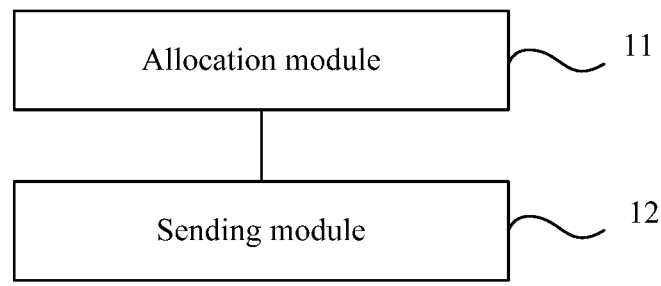
FIG. 12 is a schematic structural diagram of a switch processing apparatus according to Embodiment 7 of the present invention.

FIG. 12 is a schematic structural diagram of a switch processing apparatus according to Embodiment 7 of the present invention. The switch processing apparatus is applied to a switch processing system shown in FIG. 2 or FIG. 3, and is disposed in a controller connected to a logical Switch. As shown in FIG. 2 or FIG. 3, the logical Switch includes at least two physical Switches. The apparatus disposed in the controller includes an allocation module 11 and a sending module 12.

The allocation module 11 is configured to allocate each flow table in multiple flow tables of the logical Switch to each physical Switch, where the multiple flow tables are a pipeline of the logical Switch.

The sending module 12 is configured to send mapping information, so that each physical Switch obtains the mapping information, where the mapping information includes a mapping relationship between the physical Switch and each flow table in the multiple flow tables.

The sending module 12 is further configured to send flow entries to the logical Switch, so that each physical Switch obtains flow entries corresponding to each physical switch and processes a received data packet according to the flow entries or according to the flow entries and the mapping information, where the flow entries are content information of each flow table in a flow table set allocated by the controller to each physical Switch.

In this embodiment, when the physical Switches of the logical Switch connected to the controller include a primary Switch and a first extended Switch, a connection relationship between the controller and each physical Switch in the logical Switch is shown in FIG. 2. In this embodiment, when the physical Switches of the logical Switch connected to the controller further include a second extended Switch, a connection relationship between the controller and each physical Switch in the logical Switch is shown in FIG. 3. Manners of sending the mapping information and flow entries by the controller are the same as those in the foregoing embodiment, including multiple sending manners and a combination of various sending manners used.

It should be noted that, in the switch processing system shown in FIG. 2 and FIG. 3, the primary Switch is a switch determined in a network and connected to the controller. In addition, a flow table allocated by the allocation module 11 to the primary Switch includes at least a first flow table (table0) in the multiple flow tables of the logical Switch, so that when the primary Switch receives the data packet, the primary Switch first processes the data packet by using the table0. Other physical Switches receive and forward the mapping information and flow entries based on connection relationships with the primary Switch and connection relationships between upper-level and lower-level physical Switches.

The switch processing apparatus provided by this embodiment of the present invention is used to execute the switch processing method provided by the embodiment shown in FIG. 1 of the present invention, and has corresponding functional modules. Implementation principles and technical effects thereof are similar, and are not further described herein.

Optionally, that the sending module 12 is further configured to send flow entries to the logical Switch includes: sending the flow entries to the logical Switch, so that when a current physical Switch receives the data packet, the current physical Switch processes the data packet by using a current flow table, determines a location of a next flow table according to the mapping information sent by the sending module 12, and when the determined next flow table is located in the current physical Switch, directs the data packet to the next flow table to continue processing, or when the determined next flow table is located in another physical Switch, initiates pipeline environment protection to generate an encapsulation packet, and sends the encapsulation packet to the physical Switch corresponding to the next flow table. When the switch processing apparatus provided by this embodiment performs pipeline environment protection, pipeline environment protection is decided, initiated, and executed by a Switch. When delivering flow entries, the controller does not need to consider whether each flow table is located in a same physical switch.

The switch processing apparatus provided by this embodiment of the present invention is used to execute the switch processing method provided by the embodiment shown in FIG. 5 of the present invention, and has corresponding functional modules. Implementation principles and technical effects thereof are similar, and are not further described herein.

Figure 13:
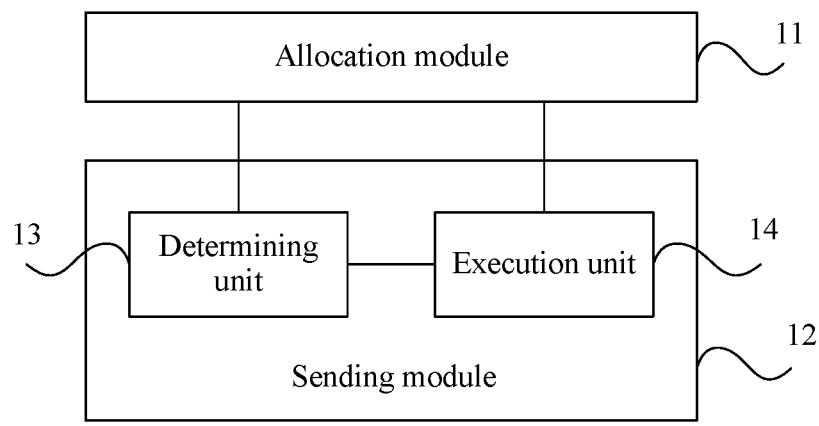
FIG. 13 is a schematic structural diagram of another switch processing apparatus according to an embodiment of the present invention.

In another possible implementation manner of this embodiment, as shown in FIG. 13, FIG. 13 is a structural flowchart of another switch processing apparatus according to an embodiment of the present invention. Specifically, pipeline environment protection is controlled by the controller and decided by the controller, and a Switch only needs to directly execute a corresponding instruction. On a basis of the structure of the foregoing apparatus shown in FIG. 12, the sending module 12 includes a determining unit 13, configured to: when a to-be-sent flow entry includes a flow table jump instruction, determine whether a next flow table is located in the current physical Switch; and an execution unit 14, configured to: when the determining unit 13 determines that the next flow table is located in the current physical Switch, send the flow entry including the flow table jump instruction to the current physical Switch, so that the current physical Switch directs the data packet to the next flow table to continue processing; or an execution unit 14, configured to: when the determining unit determines that the next flow table is located in another physical Switch, replace the flow table jump instruction in the to-be-sent flow entry with a Switch forwarding instruction, and send the flow entry including the Switch forwarding instruction to the current physical Switch, so that the current physical Switch initiates pipeline environment protection to generate an encapsulation packet and sends the encapsulation packet to the physical Switch corresponding to the next flow table.

It should be noted that, in the foregoing embodiment, although control manners when pipeline environment protection is initiated are different, manners of pipeline environment protection by the current physical Switch are the same. Specifically, the current physical Switch encapsulates the data packet and related information for processing the data packet into the encapsulation packet, where the related information for processing the data packet includes at least an ID of the next flow table, and further optionally includes any quantity of the following information: an Ingress port, an Action set, and Metadata.

Further, after performing pipeline environment protection, the current physical Switch sends the encapsulation packet generated by performing pipeline environment protection to the physical Switch corresponding to the next flow table. Correspondingly, the physical Switch corresponding to the next flow table needs to perform pipeline environment recovery to obtain the data packet. In the apparatus provided by this embodiment, pipeline environment recovery is controlled by the physical Switch corresponding to the next flow table. Specifically, the physical Switch parses the received encapsulation packet and obtains parsed information, where the parsed information includes the data packet and the related information for processing the data packet, so that the physical Switch performs pipeline environment recovery according to the parsed information and directs the data packet obtained by parsing to the next flow table to continue processing. The method for directing to the next flow table is the same as that in the foregoing embodiment, and therefore is not further described herein.

Optionally, in another possible implementation manner of this embodiment, pipeline environment recover may be controlled by the controller. Specifically, flow entries corresponding to the extended Switch and sent by the sending module 12 include a flow entry used for performing pipeline recovery; and the sending module 12 is further configured to send the flow entry used for performing pipeline recovery to the extended Switch, so that the extended Switch adds the flow entry to a first flow table table0' of the extended Switch and when the encapsulation packet is received, performs pipeline environment recovery by using the flow entry added to the table0'. It should be noted that, generally, the sending module 12 sends the flow entries beforehand. This embodiment does not limit a sequence in which the sending module 12 sends the flow entry including the Switch forwarding instruction and the flow entry used for performing pipeline recovery.

In this embodiment, the extended Switch performs pipeline environment recovery by using the received flow entry that is used for performing pipeline environment recovery and sent by the controller, where the flow entry used for performing pipeline recovery and sent by the sending module 12 may include a match part and an executable instruction. The ID of the next flow table in the encapsulation packet is used as a match object of the match part of the flow entry, and the executable instruction may include a flow table recovery instruction and/or a flow table jump instruction. A specific process of pipeline environment recovery is: the extended Switch matches, by using the flow entry in the table0', the encapsulation packet received by the extended Switch, and when the ID of the next flow table matches the flow entry in the table0', executes the flow table recovery instruction and/or the flow table jump instruction in the matched flow entry in sequence according to a match result.

The switch processing apparatus provided by this embodiment of the present invention is used to execute the switch processing method provided by the embodiment shown in FIG. 6 of the present invention, and has corresponding functional modules. Implementation principles and technical effects thereof are similar, and are not further described herein.

Embodiment 8

Figure 14:
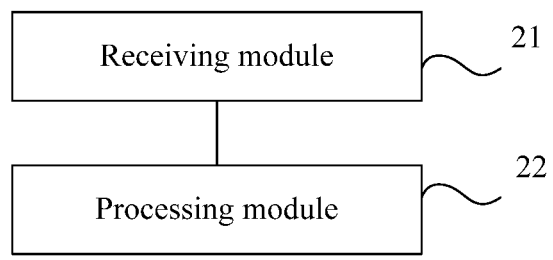
FIG. 14 is a schematic structural diagram of a switch processing apparatus according to Embodiment 8 of the present invention.

FIG. 14 is a schematic structural diagram of a switch processing apparatus according to Embodiment 8 of the present invention. The switch processing apparatus is applied to a switch processing system shown in FIG. 2 or FIG. 3, and is disposed in a physical Switch of a logical Switch connected to a controller. As shown in FIG. 2 or FIG. 3, the logical Switch includes at least two physical Switches, and the at least two physical Switches include a primary Switch and an extended Switch. The controller is connected to at least the primary Switch, and the switch processing apparatus is disposed in the primary Switch. The apparatus disposed in the primary Switch includes a receiving module 21 and a processing module 22.

The receiving module 21 is configured to receive mapping information sent by the controller, where the mapping information includes a mapping relationship between the physical Switch and each flow table in multiple flow tables of the logical Switch.

The receiving module 21 is further configured to receive flow entries sent by the controller, where the flow entries received by the receiving module 21 are content information of each flow table in a flow table set allocated by the controller to the primary Switch or allocated by the controller to the primary Switch and the extended Switch.

The processing module 22 is configured to process, according to the flow entries received by the receiving module 21 or according to the flow entries and the mapping information that are received by the receiving module 21, a data packet received by the primary Switch.

In this embodiment, when the controller allocates each flow table in the multiple flow tables to different physical Switches for sharing, a first flow table table0 in the multiple flow tables of the logical Switch is necessarily allocated to the primary Switch. The processing module 22 is configured to process, by using the table0, the received data packet according to the flow entries received by the receiving module 21 or according to the flow entries and the mapping information that are received by the receiving module 21. Similar to the foregoing embodiment, the extended Switch in this embodiment may also include a first extended Switch and a second extended Switch. The primary Switch is connected to at least the first extended Switch, and the second extended Switch is connected to at least the first extended Switch. A manner of distributing the mapping information and flow entries is the same as that in the foregoing embodiment, and is related to a connection relationship between each physical Switch and the controller. For the connection relationship between each physical Switch and the controller in this embodiment, reference may be made to FIG. 2 and FIG. 3, and therefore, details are not described herein. It should be noted that, in this embodiment, the data packet received by the primary Switch may be generally sent by an external node, for example, a computer that may perform mutual access with the primary Switch.

The switch processing apparatus provided by this embodiment of the present invention is used to execute the switch processing method provided by the embodiment shown in FIG. 7 of the present invention, and has corresponding functional modules. Implementation principles and technical effects thereof are similar, and are not further described herein.

Figure 15:
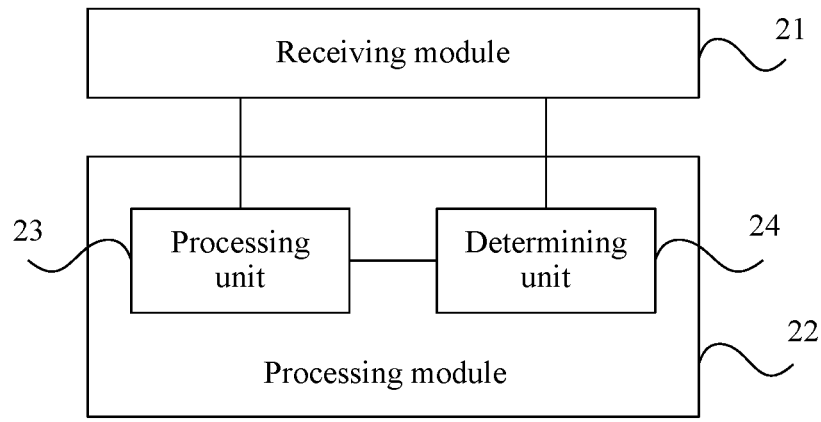
FIG. 15 is a schematic structural diagram of still another switch processing apparatus according to an embodiment of the present invention.

FIG. 15 is a schematic structural diagram of still another switch processing apparatus according to an embodiment of the present invention. On a basis of the structure of the switch processing apparatus shown in FIG. 14, the processing module 22 includes a processing unit 23, configured to process a data packet when the data packet is received; and a determining unit 24, configured to determine a location of a next flow table according to mapping information received by the receiving module 21. The processing unit 23 is further configured to: when the determining unit 24 determines that the next flow table is located in the primary Switch, direct the data packet to the next flow table to continue processing; or the processing unit 23 is further configured to: when the determining unit 24 determines that the next flow table is located in an extended Switch, initiate pipeline environment protection to generate an encapsulation packet, and send the encapsulation packet to the extended Switch corresponding to the next flow table. The embodiment shown in FIG. 15 is pipeline environment protection controlled by the primary Switch, and is decided, initiated, and executed by the primary Switch. When delivering flow entries, the controller does not need to consider whether each flow table is located in a same physical switch.

The switch processing apparatus provided by this embodiment of the present invention is used to execute the switch processing method provided by the embodiment shown in FIG. 8 of the present invention, and has corresponding functional modules. Implementation principles and technical effects thereof are similar, and are not further described herein.

Optionally, in another possible implementation manner of the present invention, pipeline environment protection may be controlled by the controller and decided by the controller. The primary Switch only needs to directly execute a corresponding instruction, and the apparatus shown in FIG. 14 may execute the instruction. That the receiving module 21 is further configured to receive flow entries sent by the controller includes: receiving a flow entry that includes a flow table jump instruction or a Switch forwarding instruction and is sent by the controller, where the flow table jump instruction or the Switch forwarding instruction in the flow entry is determined by the controller according to whether a next flow table in the flow entry is located in the primary Switch, and if yes, the flow entry includes the flow table jump instruction, or if no, the flow entry includes the Switch forwarding instruction; and the processing module 22 is configured to: when the flow entry matching the received data packet includes the flow table jump instruction, direct the data packet to the next flow table to continue processing; or the processing module 22 is configured to: when the flow entry matching the received data packet includes the Switch forwarding instruction, initiate pipeline environment protection to generate an encapsulation packet, and send the encapsulation packet to an extended Switch corresponding to the next flow table.

In specific implementation of this embodiment, that the processing module 22 initiates pipeline environment protection includes: encapsulating the data packet and related information for processing the data packet into the encapsulation packet, where the related information for processing the data packet includes at least an ID of the next flow table, and further optionally includes any quantity of the following information: an Ingress port, an Action set, and Metadata.

Further, after performing pipeline environment protection, the processing module 22 sends the encapsulation packet generated by performing pipeline environment protection to the extended Switch corresponding to the next flow table. Correspondingly, the extended Switch needs to perform pipeline environment recovery to obtain the data packet. When the switch processing apparatus provided by this embodiment performs pipeline environment recovery, pipeline environment recovery is controlled by the extended Switch. Specifically, the extended Switch parses the received encapsulation packet and obtains parsed information, where the parsed information includes the data packet and the related information for processing the data packet. The related information for processing the data packet also includes the ID of the next flow table, and further optionally includes any quantity of the following information: an ingress port, an Action set, and Metadata, so that the extended Switch performs pipeline environment recovery according to the parsed information and directs the data packet obtained by parsing to the next flow table to continue processing. The method for directing the data packet to the next flow table is the same as that in the foregoing embodiment, and therefore is not further described herein. Similarly, pipeline environment recovery may be further implemented under control of the controller. A specific implementation manner is the same as that in the foregoing embodiment. Because the switch processing apparatus provided by this embodiment is disposed in the primary Switch, and processing by the primary Switch does not involve pipeline environment recovery, details are not described herein.

Embodiment 9

Figure 16:
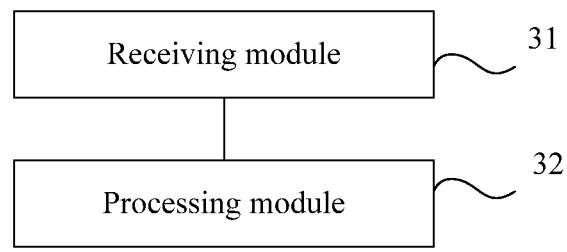
FIG. 16 is a schematic structural diagram of a switch processing apparatus according to Embodiment 9 of the present invention.

FIG. 16 is a schematic structural diagram of a switch processing apparatus according to Embodiment 9 of the present invention. The switch processing apparatus is applied to a switch processing system shown in FIG. 3, and is disposed in a physical Switch of a logical Switch connected to a controller. As shown in FIG. 2 and FIG. 3, the logical Switch includes multiple physical Switches, the multiple physical Switches include a primary Switch and an extended Switch, and the extended Switch includes a first extended Switch and a second extended Switch. The controller is connected to at least the primary Switch, the primary Switch is connected to at least the first extended Switch, and the second extended Switch is connected to at least the first extended Switch. The switch processing apparatus is disposed in the extended Switch. The apparatus disposed in the extended Switch includes a receiving module 31 and a processing module 32.

The receiving module 31 is configured to receive mapping information sent by the controller and/or the primary Switch and/or another extended Switch, where the mapping information includes a mapping relationship between the physical Switch and each flow table in multiple flow tables of the logical Switch.

The receiving module 31 is further configured to receive flow entries corresponding to the current extended Switch and sent by the controller and/or the primary Switch and/or the another extended Switch, where the flow entries received by the receiving module 31 are content information of each flow table in a flow table set allocated by the controller to the current extended Switch.

The processing module 32 is configured to process, according to the flow entries received by the receiving module 31 or according to the flow entries and the mapping information that are received by the receiving module 31, a first encapsulation packet received by the current extended Switch, where the first encapsulation packet is generated by a physical Switch in which a previous flow table is located, by encapsulating a data packet received by the physical Switch and related information for processing the data packet.

This embodiment may be executed by the first extended Switch or the second extended Switch. A manner in which the extended Switch receives the mapping information and flow entries sent by the controller is similar to that in the foregoing embodiment, that is, the mapping information and/or flow entries received by the current extended Switch may be directly sent by the controller, or may be forwarded by the primary Switch, or may be forwarded by the another extended Switch, or a combination of the foregoing multiple manners may be used. It should be noted that, when the controller allocates each flow table in the multiple flow tables to different physical Switches for sharing, a first flow table table0 in the multiple flow tables of the logical Switch is necessarily allocated to the primary Switch. Therefore, in the mapping information received by the receiving module 31, the table0 in the multiple flow tables of the logical Switch corresponds to the primary Switch. In this embodiment, a manner of distributing the mapping information and flow entries is the same as that in the foregoing embodiment, and is related to a connection relationship between each physical Switch and the controller. For the connection relationship between each physical Switch and the controller in this embodiment, reference may be made to FIG. 3, and therefore, details are not described herein.

The switch processing apparatus provided by this embodiment of the present invention is used to execute the switch processing method provided by the embodiment shown in FIG. 9 of the present invention, and has corresponding functional modules. Implementation principles and technical effects thereof are similar, and are not further described herein.

In this embodiment, the receiving module 31 is further configured to receive the first encapsulation packet after receiving the flow entries corresponding to the current extended Switch; and the processing module 32 is configured to: when determining that a number ID of a next flow table in the first encapsulation packet received by the receiving module 31 is located in another physical Switch, forward, according to the mapping information received by the receiving module 31, the first encapsulation packet received by the receiving module 31 to the physical Switch corresponding to the ID of the next flow table; or the processing module 32 is configured to: when determining that an ID of a next flow table in the first encapsulation packet received by the receiving module 31 is located in the current extended Switch, perform pipeline environment recovery on the first encapsulation packet received by the receiving module 31 to obtain the data packet.

Figure 17:
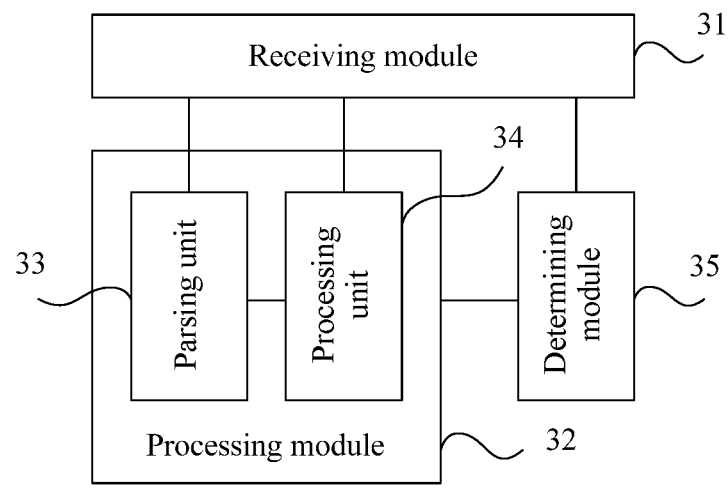
FIG. 17 is a schematic structural diagram of yet another switch processing apparatus according to an embodiment of the present invention.

FIG. 17 is a schematic structural diagram of yet another switch processing apparatus according to an embodiment of the present invention. In specific implementation of this embodiment, when the processing module 32 of the current extended Switch performs pipeline environment recovery, pipeline environment recovery may be controlled by the current extended Switch. In this case, the processing module 32 includes: a parsing unit 33, configured to parse the first encapsulation packet received by the receiving module 31 to obtain parsed information, where the parsed information includes the data packet and the related information for processing the data packet, where the related information for processing the data packet includes at least the ID of the next flow table, and further optionally includes any quantity of the following information: an Ingress port, an Action set, and Metadata; and a processing unit 34, configured to perform pipeline environment recovery according to the parsed information obtained by the parsing unit 33, and direct the data packet to the next flow table to continue processing. The method for directing the data packet to the next flow table is the same as that in the foregoing embodiment, and therefore is not further described herein.

Optionally, in another possible implementation manner of this embodiment, pipeline environment recovery may also be controlled by the controller and decided by the controller, and a Switch only needs to directly execute a corresponding instruction. In specific implementation, the flow entries received by the current extended Switch include a flow entry used for performing pipeline recovery and sent by the controller; and correspondingly, the flow entries received by the receiving module 31 include the flow entry used for performing pipeline recovery and sent by the controller. In this case, the processing module 32 includes: an adding unit, configured to add the flow entry used for performing pipeline recovery to a first flow table table0' of the current extended Switch; and a processing unit, configured to perform, by using the flow entry added to the table0', pipeline environment recovery on the first encapsulation packet received by the receiving module. In specific implementation, the first encapsulation packet received by the receiving module 31 includes the ID of the next flow table, and the flow entry used for performing pipeline recovery and received by the receiving module 31 includes a match part and an executable instruction, where the executable instruction includes a flow table recovery instruction and/or a flow table jump instruction; and the processing unit is configured to match, by using the flow entry in the table0', the first encapsulation packet received by the receiving module 31, and when the flow entry in the table0' is matched successfully, execute the flow table recovery instruction and/or the flow table jump instruction in the matched flow entry in sequence according to a match result.

Further, after performing pipeline environment recovery, the processing module 32 of the current extended Switch may continue to process the obtained data packet. A manner of processing the data packet is similar to that in the foregoing embodiment. Likewise, with reference to the mapping information, a location of a next flow table for processing the data packet may be determined, and a processing manner is determined. Specifically, on a basis of the foregoing embodiment shown in FIG. 17, the processing module 32 is further configured to: after performing pipeline environment recovery on the first encapsulation packet received by the receiving module 31, when obtaining the data packet, process the data packet by using the current flow table. In this case, the apparatus further includes a determining module 35, configured to determine a location of a next flow table according to the mapping information; and the processing module 32 is further configured to: when the determining module 35 determines that the next flow table is located in the current extended Switch, direct the data packet to the next flow table to continue processing; or the processing module 32 is further configured to: when the determining module determines that the next flow table is located in the another extended Switch, initiate pipeline environment protection to generate a second encapsulation packet, and send the second encapsulation packet to the extended Switch corresponding to the next flow table. The method provided by this embodiment is pipeline environment protection controlled by the current extended Switch, and is decided, initiated, and executed by the current extended Switch. When delivering flow entries, the controller does not need to consider whether each flow table is located in a same physical switch.

Optionally, similar to the foregoing embodiment, in another possible implementation manner of this embodiment, pipeline environment protection may be controlled by the controller and decided by the controller, and the current extended Switch only needs to directly execute a corresponding instruction. A specific implementation manner is: the receiving module 31 is further configured to receive a flow entry that includes a flow table jump instruction or a Switch forwarding instruction and is sent by the controller, where the flow table jump instruction or the Switch forwarding instruction in the flow entry is determined by the controller according to whether the next flow table in the flow entry is located in the current extended Switch, and if yes, the flow entry includes the flow table jump instruction, or if no, the flow entry includes the Switch forwarding instruction. In this case, the processing module 32 is further configured to: after performing pipeline environment recovery on the first encapsulation packet received by the receiving module 31, obtain the data packet in the first encapsulation packet, and when the flow entry matching the data packet includes the flow table jump instruction, direct the data packet to the next flow table to continue processing; or obtain the data packet in the first encapsulation packet, and when the flow entry matching the data packet includes the Switch forwarding instruction, initiate pipeline environment protection to generate a second encapsulation packet, and send the second encapsulation packet to an extended Switch corresponding to the next flow table.

It should be noted that, in the foregoing embodiment, a manner of initiating pipeline environment recovery by the processing module 32 is the same, and includes: encapsulating the data packet and related information for processing the data packet into the second encapsulation packet, where the related information for processing the data packet includes at least the ID of the next flow table, and further includes any quantity of the following information: an Ingress port, an Action set, and Metadata.

The switch processing apparatus provided by this embodiment of the present invention is used to execute the switch processing method provided by the embodiment shown in FIG. 10 of the present invention, and has corresponding functional modules. Implementation principles and technical effects thereof are similar, and are not further described herein.

Figure 18:
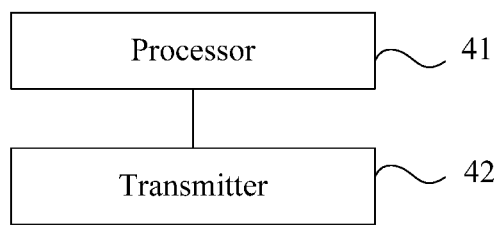
FIG. 18 is a schematic structural diagram of a controller according to an embodiment of the present invention.

FIG. 18 is a schematic structural diagram of a controller according to an embodiment of the present invention. The controller is applied to a switch processing system shown in FIG. 2 or FIG. 3, and is connected to a logical Switch. As shown in FIG. 2 and FIG. 3, the logical Switch includes at least two physical Switches, and the physical Switches include a primary Switch and a first extended Switch. The controller is connected to at least the first extended Switch, and the first extended Switch is connected to at least the primary Switch. As shown in FIG. 3, the physical Switches further include a second extended Switch, and the second extended Switch is connected to at least the first extended Switch. As shown in FIG. 18, the controller provided by this embodiment includes a processor 41 and a transmitter 42. A manner of sending mapping information and flow entries by the controller provided by this embodiment and a manner of connection with each physical Switch in the logical Switch are the same as those in the foregoing embodiment, and are not further described herein.

In the controller provided by this embodiment, the processor 41 is configured to implement a function of the allocation module 11 of the switch processing apparatus in the embodiments shown in FIG. 12 to FIG. 13; and the transmitter 42 is configured to implement a function of the sending module 12 of the switch processing apparatus in the embodiments shown in FIG. 12 to FIG. 13. The controller provided by this embodiment of the present invention is configured to execute the switch processing methods provided by the embodiments shown in FIG. 1, FIG. 5, and FIG. 6, and has a corresponding physical apparatus. Implementation principles and technical effects thereof are similar, and are not further described herein.

Figure 19:
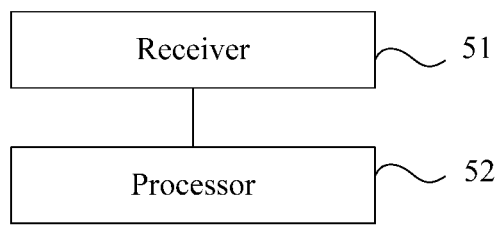
FIG. 19 is a schematic structural diagram of a primary switch according to an embodiment of the present invention.

FIG. 19 is a schematic structural diagram of a primary switch according to an embodiment of the present invention. The primary switch is applied to a switch processing system shown in FIG. 2 or FIG. 3, and is a physical Switch of a logical Switch connected to a controller. As shown in FIG. 2, the logical Switch includes at least two physical Switches, and the physical Switches include a primary Switch and a first extended Switch. The controller is connected to at least the first extended Switch, and the first extended Switch is connected to at least the primary Switch. As shown in FIG. 3, the physical Switches further include a second extended Switch, and the second extended Switch is connected to at least the first extended Switch. As shown in FIG. 19, the primary Switch provided by this embodiment includes a receiver 51 and a processor 52. A manner of receiving and forwarding mapping information and flow entries by the primary Switch provided by this embodiment and a manner of connection with each extended Switch in the logical Switch and the controller are the same as those in the foregoing embodiment, and are not further described herein.

In the controller provided by this embodiment, the receiver 51 is configured to implement a function of the receiving module 21 of the switch processing apparatus in the embodiments shown in FIG. 14 to FIG. 15; and the processor 52 is configured to implement a function of the processing module 22 of the switch processing apparatus in the embodiments shown in FIG. 14 to FIG. 15. The primary Switch provided by this embodiment of the present invention is configured to execute the switch processing methods provided by the embodiments shown in FIG. 7 to FIG. 8, and has a corresponding physical apparatus. Implementation principles and technical effects thereof are similar, and are not further described herein.

Figure 20:
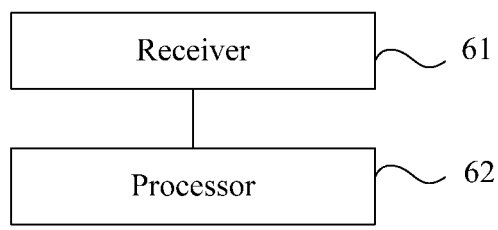
FIG. 20 is a schematic structural diagram of an extended switch according to an embodiment of the present invention.

FIG. 20 is a schematic structural diagram of an extended switch according to an embodiment of the present invention. The extended switch is applied to a switch processing system shown in FIG. 2 or FIG. 3, and is a physical Switch of a logical Switch connected to a controller. As shown in FIG. 2, the logical Switch includes at least two physical Switches, and the physical Switches include a primary Switch and a first extended Switch. The controller is connected to at least the first extended Switch, and the first extended Switch is connected to at least the primary Switch. As shown in FIG. 3, the physical Switches further include a second extended Switch, and the second extended Switch is connected to at least the first extended Switch. As shown in FIG. 20, the extended Switch provided by this embodiment includes a receiver 61 and a processor 62. A manner of receiving and forwarding mapping information and flow entries by the extended Switch provided by this embodiment and a manner of connection with another physical Switch in the logical Switch and the controller are the same as those in the foregoing embodiment, and are not further described herein.

In the controller provided by this embodiment, the receiver 61 is configured to implement a function of the receiving module 31 of the switch processing apparatus in the embodiments shown in FIG. 16 to FIG. 17; and the processor 62 is configured to implement a function of the processing module 32 of the switch processing apparatus in the embodiments shown in FIG. 16 to FIG. 17. The extended Switch provided by this embodiment of the present invention is configured to execute the switch processing methods provided by the embodiments shown in FIG. 9 to FIG. 10, and has a corresponding physical apparatus. Implementation principles and technical effects thereof are similar, and are not further described herein.

FIG. 2 and FIG. 3 are also schematic structural diagrams of a switch processing system according to an embodiment of the present invention. As shown in FIG. 2 and FIG. 3, the switch processing system provided by this embodiment includes the controller shown in FIG. 18, the primary Switch shown in FIG. 19, and the extended Switch shown in FIG. 20. In this embodiment, connection relationships between the controller, the primary Switch, and the extended Switch are shown in FIG. 2 and FIG. 3. Manners of sending mapping information and flow entries by the controller and receiving and forwarding the mapping information and flow entries by each physical Switch are the same as those in each of the foregoing embodiments, and are not further described herein. The controller, the primary Switch, and the extended Switch in the switch processing system provided by this embodiment are configured to implement the switch processing methods shown in FIG. 1 and FIG. 5 to FIG. 11, and have corresponding physical components. Implementation principles and technical effects thereof are similar, and are not further described herein.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A switch processing method, wherein the method is executed by a controller and a logical switch, the logical Switch comprises at least two physical Switches, and the method comprises:

allocating, by the controller, a flow table in multiple flow tables of the logical Switch to each physical Switch, wherein the multiple flow tables are a pipeline of the logical Switch;

sending, by the controller, mapping information, so that each physical Switch obtains the mapping information, wherein the mapping information comprises a mapping relationship between the physical Switch and each flow table in the multiple flow tables; and sending, by the controller, flow entries to the logical Switch, so that each physical Switch obtains flow entries corresponding to each physical switch and processes a received data packet according to the flow entries or according to the flow entries and the mapping information, and so that a current physical Switch that receives the data packet initiates, in response to a next flow table determined by the current physical Switch being located in another physical Switch, pipeline environment protection to generate an encapsulation packet, and sends the encapsulation packet to the physical Switch corresponding to the next flow table, wherein the flow entries are content information of each flow table in a flow table set allocated by the controller to each physical Switch;

wherein the pipeline environment protection comprises the current physical Switch encapsulating the data packet and related information for processing the data packet into the encapsulation packet, wherein the related information for processing the data packet comprises at least an identity of the next flow table, and further comprises information regarding at least one of an ingress port, an action set currently corresponding to the data packet, and metadata.

2. The method according to claim 1, wherein the at least two physical Switches comprise a primary Switch and a first extended Switch, wherein the controller is connected to at least the primary Switch, and the first extended Switch is connected to at least the primary Switch;

the sending, by the controller, mapping information, comprises:

sending, by the controller, the mapping information to at least the primary Switch, so that the primary Switch receives the mapping information and the mapping information received by the first extended Switch comprises the mapping information sent by at least one of the controller or the primary Switch; and the sending, by the controller, flow entries to the logical Switch, comprises:

sending, by the controller, the flow entries of the logical Switch to at least the primary Switch, so that the flow entries received by the primary Switch comprise flow entries corresponding to the primary Switch or the flow entries corresponding to each physical Switch and flow entries received by the first extended Switch comprise flow entries sent by the at least one of the controller or the primary Switch.

3. The method according to claim 2, wherein the physical Switches further comprise a second extended Switch, and the second extended Switch is connected to at least the first extended Switch;

the sending, by the controller, mapping information, comprises:

sending, by the controller, the mapping information to at least the primary Switch, so that the primary Switch receives the mapping information, the mapping information received by the first extended Switch comprises the mapping information sent by the at least one of the controller or the primary Switch, and the mapping information received by the second extended Switch comprises the mapping information sent by at least one of the controller or the primary Switch or the first extended Switch; and the sending, by the controller, flow entries to the logical Switch, comprises:

sending, by the controller, the flow entries of the logical Switch to at least the primary Switch, so that the flow entries received by the primary Switch comprise flow entries corresponding to the primary Switch or flow entries corresponding to the primary Switch and flow entries corresponding to at least one of the first extended Switch or the second extended Switch, flow entries received by the first extended Switch comprise flow entries corresponding to the first extended Switch and sent by the at least one of the controller or the primary Switch, and flow entries received by the second extended Switch comprise flow entries corresponding to the second extended Switch and sent by the at least one of the controller or the primary Switch or the first extended Switch.

4. The method according to claim 2, wherein a flow table allocated by the controller to the primary Switch comprises at least a first flow table (tableO) in the multiple flow tables of the logical Switch, so that when the primary Switch receives the data packet, the primary Switch processes the data packet by using the tableO.

5. The method according to claim 1, wherein the sending, by the controller, flow entries to the logical Switch, comprises:

sending, by the controller, the flow entries to the logical Switch, so that when a current physical Switch receives the data packet, the current physical Switch processes the data packet by using a current flow table, determines a location of a next flow table according to the mapping information, and when the determined next flow table is located in the current physical Switch, directs the data packet to the next flow table to continue processing.

6. The method according to claim 5, wherein the pipeline environment protection is used to enable the physical Switch corresponding to the next flow table to parse the encapsulation packet received by the physical Switch and obtain parsed information, so as to perform pipeline environment recovery according to the parsed information and direct the data packet to the next flow table to continue processing, wherein the parsed information comprises the data packet and the related information for processing the data packet.

7. The method according to claim 3, wherein the flow entries corresponding to an extended Switch and sent by the controller comprise a flow entry used for performing pipeline recovery; and the method further comprises:

sending, by the controller, the flow entry used for performing pipeline recovery to the extended Switch, so that the extended Switch adds the flow entry to a first flow table (tableO') of the extended Switch and when the encapsulation packet is received, performs pipeline environment recovery by using the flow entry added to the tableO'.

8. The method according to claim 7, wherein the encapsulation packet comprises the ID of the next flow table, and the flow entry used for performing pipeline recovery comprises a match part and an executable instruction, wherein the match part is used by the extended Switch to take the ID of the next flow table as a match object corresponding to the flow entry, and the executable instruction comprises at least one of a flow table recovery instruction or a flow table jump instruction; and the pipeline environment recovery is that the extended Switch matches, by using the flow entry in the tableO', the encapsulation packet received by the extended Switch, and when the ID of the next flow table matches the flow entry in the tableO', executes the at least one of the flow table recovery instruction or the flow table jump instruction in the matched flow entry in sequence according to a match result.

9. The method according to claim 1, wherein the sending, by the controller, flow entries to the logical Switch, comprises:

when a to-be-sent flow entry comprises a flow table jump instruction, determining, by the controller, whether a next flow table is located in a current physical Switch; and when determining that the next flow table is located in the current physical Switch, sending, by the controller, the flow entry comprising the flow table jump instruction to the current physical Switch, so that the current physical Switch directs the data packet to the next flow table to continue processing; or when determining that the next flow table is located in another physical Switch, replacing, by the controller, the flow table jump instruction in the to-be-sent flow entry with a Switch forwarding instruction, and sending the flow entry comprising the Switch forwarding instruction to the current physical Switch, so that the current physical Switch initiates the pipeline environment protection to generate the encapsulation packet and sends the encapsulation packet to the physical Switch corresponding to the next flow table.

10. A controller, connected to a logical switch, wherein the logical Switch comprises at least two physical Switches, and the controller comprises:

a processor, configured to allocate each flow table in multiple flow tables of the logical Switch to each physical Switch, wherein the multiple flow tables are a pipeline of the logical Switch; and a transmitter, in communication with the processor and configured to send mapping information, so that each physical Switch obtains the mapping information, wherein the mapping information comprises a mapping relationship between the physical Switch and each flow table in the multiple flow tables; wherein the transmitter is further configured to send flow entries to the logical Switch, so that each physical Switch obtains flow entries corresponding to each physical switch and processes a received data packet according to the flow entries or according to the flow entries and the mapping information, so that a current physical Switch that receives the data packet initiates, in response to a next flow table determined by the current physical switch not being located in the current physical Switch, pipeline environment protection to generate an encapsulation packet, and sends the encapsulation packet to a physical Switch corresponding to the next flow table, wherein the flow entries are content information of each flow table in a flow table set allocated by the controller to each physical Switch;

wherein the pipeline environment protection comprises the current physical Switch encapsulating the data packet and related information for processing the data packet into the encapsulation packet, wherein the related information for processing the data packet comprises at least an identity of the next flow table, and further comprises information regarding at least one of an ingress port, an action set currently corresponding to the data packet, and metadata.

11. The controller according to claim 10, wherein the at least two physical Switches comprise a primary Switch and a first extended Switch, wherein the controller is connected to at least the primary Switch, and the first extended Switch is connected to at least the primary Switch;

that the transmitter is configured to send mapping information comprises: sending the mapping information to at least the primary Switch, so that the primary Switch receives the mapping information and that the mapping information received by the first extended Switch comprises the mapping information sent by at least one of the controller or the primary Switch; and that the transmitter is further configured to send flow entries to the logical Switch comprises: sending the flow entries of the logical Switch to at least the primary Switch, so that the flow entries received by the primary Switch comprise flow entries corresponding to the primary Switch or the flow entries corresponding to each physical Switch and that flow entries received by the first extended Switch comprise flow entries sent by the at least one of controller or the primary Switch.

12. The controller according to claim 11, wherein the physical Switches further comprise a second extended Switch, and the second extended Switch is connected to at least the first extended Switch;

that the transmitter is configured to send mapping information comprises: sending the mapping information to at least the primary Switch, so that the primary Switch receives the mapping information, the mapping information received by the first extended Switch comprises the mapping information sent by the at least one of the controller or the primary Switch, and the mapping information received by the second extended Switch comprises the mapping information sent by at least one of the controller or the primary Switch or the first extended Switch; and that the transmitter is further configured to send flow entries to the logical Switch comprises: sending the flow entries of the logical Switch to at least the primary Switch, so that the flow entries received by the primary Switch comprise flow entries corresponding to the primary Switch or flow entries corresponding to the primary Switch and flow entries corresponding to at least one of the first extended Switch or the second extended Switch, flow entries received by the first extended Switch comprise flow entries corresponding to the first extended Switch and sent by at least one of the controller or the primary Switch, and flow entries received by the second extended Switch comprise flow entries corresponding to the second extended Switch and sent by at least one of the controller or the primary Switch or the first extended Switch.

13. The controller according to claim 11, wherein a flow table allocated by the processor to the primary Switch comprises at least a first flow table (tableO) in the multiple flow tables of the logical Switch, so that when the primary Switch receives the data packet, the primary Switch processes the data packet by using the tableO.

14. The controller according to claim 10, wherein that the transmitter is further configured to send flow entries to the logical Switch comprises: sending the flow entries to the logical Switch, so that when a current physical Switch receives the data packet, the current physical Switch processes the data packet by using a current flow table, determines, according to the mapping information sent by the transmitter, whether a next flow table is located in the current physical Switch, and in response to the next flow table being located in the current physical Switch, directs the data packet to the next flow table to continue processing.

15. The controller according to claim 14, wherein the pipeline environment protection is used to enable the physical Switch corresponding to the next flow table to parse the encapsulation packet received by the physical Switch and obtain parsed information, so as to perform pipeline environment recovery according to the parsed information and direct the data packet to the next flow table to continue processing, wherein the parsed information comprises the data packet and the related information for processing the data packet.

16. The controller according to claim 12, wherein the flow entries corresponding to an extended Switch and sent by the transmitter comprise a flow entry used for performing pipeline recovery; and the transmitter is further configured to send the flow entry used for performing pipeline recovery to the extended Switch, so that the extended Switch adds the flow entry to a first flow table (table0') of the extended Switch and when the encapsulation packet is received, performs pipeline environment recovery by using the flow entry added to the table0'.

17. The controller according to claim 16, wherein the encapsulation packet comprises the ID of the next flow table, and the flow entry used for performing pipeline recovery and sent by the transmitter comprises a match part and an executable instruction, wherein the match part is used by the extended Switch to take the ID of the next flow table as a match object corresponding to the flow entry, and the executable instruction comprises at least one of a flow table recovery instruction or a flow table jump instruction; and the pipeline environment recovery is that the extended Switch matches, by using the flow entry in the table0', the encapsulation packet received by the extended Switch, and when the ID of the next flow table matches the flow entry in the table0', executes the at least one of the flow table recovery instruction or the flow table jump instruction in the matched flow entry in sequence according to a match result.

18. The controller according to claim 10, wherein that the transmitter is further configured to send flow entries to the logical Switch comprises: when a to-be-sent flow entry comprises a flow table jump instruction, determining whether a next flow table is located in the current physical Switch; and if yes, sending the flow entry comprising the flow table jump instruction to the current physical Switch, so that the current physical Switch directs the data packet to the next flow table to continue processing; or if no, replacing the flow table jump instruction in the to-be-sent flow entry with a Switch forwarding instruction, and sending the flow entry comprising the Switch forwarding instruction to the current physical Switch, so that the current physical Switch initiates the pipeline environment protection to generate the encapsulation packet and sends the encapsulation packet to a physical Switch corresponding to the next flow table.

* * * * *